US011714465B2

(12) United States Patent
Brockman et al.

(10) Patent No.: US 11,714,465 B2
(45) Date of Patent: *Aug. 1, 2023

(54) SYSTEMS AND METHODS FOR AGGREGATION AND INTEGRATION OF DISTRIBUTED GRID ELEMENTS INPUTS FOR PROVIDING AN INTERACTIVE ELECTRIC POWER GRID GEOGRAPHIC VISUALIZATION

(71) Applicant: Causam Enterprises, Inc., Raleigh, NC (US)

(72) Inventors: Nathaniel Taylor Brockman, Mt. Pleasant, SC (US); Joseph W. Forbes, Jr., Raleigh, NC (US)

(73) Assignee: CAUSAM ENTERPRISES, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,712

(22) Filed: Sep. 19, 2022

(65) Prior Publication Data
US 2023/0015983 A1 Jan. 19, 2023

Related U.S. Application Data

(63) Continuation of application No. 16/599,904, filed on Oct. 11, 2019, now Pat. No. 11,474,573, which is a
(Continued)

(51) Int. Cl.
*G06F 3/0481* (2022.01)
*G06F 1/18* (2006.01)
(Continued)

(52) U.S. Cl.
CPC .......... *G06F 1/189* (2013.01); *G01C 21/3673* (2013.01); *G01C 21/3852* (2020.08); *G01C 21/3878* (2020.08); *G06F 3/0481* (2013.01); *G06F 16/5866* (2019.01); *G06Q 10/06315* (2013.01); *G06Q 10/101* (2013.01); *G06Q 50/01* (2013.01); *G06V 20/176* (2022.01); *G07C 3/12* (2013.01); *G07F 17/3209* (2013.01);
(Continued)

(58) Field of Classification Search
None
See application file for complete search history.

(56) References Cited

U.S. PATENT DOCUMENTS

2010/0100250 A1* 4/2010 Budhraja .......... H02J 13/00002
709/224
2013/0268196 A1* 10/2013 Dam ...................... G01W 1/10
702/3

(Continued)

*Primary Examiner* — Tuan S Nguyen
(74) *Attorney, Agent, or Firm* — Neo IP

(57) ABSTRACT

Systems and methods for aggregating and integrating distributed grid element inputs are disclosed. A data platform is provided for a distribution power grid. The data platform provides a crowd-sourced gaming system for identifying grid elements and determining dynamic electric power topology. The data platform also provides an interactive interface for displaying a view of a certain area with identified grid elements. The data platform communicatively connects to the identified grid elements, collects data from the identified grid elements, and manages the distribution power grid.

20 Claims, 26 Drawing Sheets

Related U.S. Application Data continuation of application No. 15/269,120, filed on Sep. 19, 2016, now Pat. No. 10,444,806.

(60) Provisional application No. 62/222,988, filed on Sep. 24, 2015.

(51) Int. Cl.

| | | |
|---|---|---|
| *G07F 17/32* | (2006.01) | |
| *G06Q 50/00* | (2012.01) | |
| *G01C 21/36* | (2006.01) | |
| *G06Q 10/101* | (2023.01) | |
| *G06F 16/58* | (2019.01) | |
| *G06Q 10/0631* | (2023.01) | |
| *G07C 3/12* | (2006.01) | |
| *G06V 20/10* | (2022.01) | |
| *G01C 21/00* | (2006.01) | |
| *H02J 3/00* | (2006.01) | |

(52) U.S. Cl.
CPC ...... *G07F 17/3225* (2013.01); *G07F 17/3255* (2013.01); *H02J 3/003* (2020.01); *H02J 2203/20* (2020.01); *Y02E 60/00* (2013.01); *Y04S 10/40* (2013.01); *Y04S 20/221* (2013.01); *Y04S 40/20* (2013.01); *Y04S 50/10* (2013.01)

(56) References Cited

U.S. PATENT DOCUMENTS

| | | | |
|---|---|---|---|
| 2014/0278162 A1* | 9/2014 | Riley, Jr. | G01R 31/088 702/58 |
| 2015/0006141 A1* | 1/2015 | Enenkel | H02J 13/00017 703/18 |
| 2015/0269438 A1 | 9/2015 | Samarasekera et al. | |
| 2016/0004724 A1 | 1/2016 | Har-Noy et al. | |
| 2017/0092055 A1 | 3/2017 | Brockman et al. | |
| 2020/0043285 A1 | 2/2020 | Brockman et al. | |

\* cited by examiner

SYSTEMS AND METHODS FOR AGGREGATION AND INTEGRATION OF DISTRIBUTED GRID ELEMENTS INPUTS FOR PROVIDING AN INTERACTIVE ELECTRIC POWER GRID GEOGRAPHIC VISUALIZATION

CROSS-REFERENCE TO RELATED APPLICATION

The present invention is related to and claims priority from the following U.S. patent documents: This application is a continuation of U.S. patent application Ser. No. 16/599,904, filed Oct. 11, 2019, which is a continuation of U.S. patent application Ser. No. 15/269,120, filed Sep. 19, 2016 and issued Oct. 15, 2019, now U.S. Pat. No. 10,444,806, which claims priority to U.S. Provisional Patent Application No. 62/222,988, filed Sep. 24, 2015, each of which is incorporated herein by reference in its entirety.

BACKGROUND OF THE INVENTION

1. Field of the Invention

The present invention relates to electric grid management and visualization, and more particularly, to electric power topology and interactive graphical user interfaces (GUIs) that provide for modeling, introduction, operational command and control, and advanced energy settlements, messaging, and applications for electric power supply, load, and/or curtailment and data analytics associated with the distributed electric resources (DERs) for microgrids and broader electric power grids.

2. Description of the Prior Art

Generally, it is known in the prior art to provide electric power systems management. It is also known in the art to provide transmission line cartography; however, these maps are only a static representation and do not provide for distribution of grid elements, particularly for those grid elements that are connected to the electric power grid at the distribution level or for those sources of supply, such as renewables, storage technologies, electric vehicles or any mobile or fixed source of distributed energy resources as defined by NERC, FERC or the appropriate governing body that regulates the electric power grid. These maps and graphical user interfaces (GUIs) do not provide for interactive visual representation of electric power topology and integration with electric power systems modeling and management. In most utilities, market participants and grid operates to include Independent System Operators (ISOs), the grid modeling system is designed to model power flows and grid elements attached at the transmission level and modeled to logical nodes such as electrical buses, sources of macro generation (large generation facilities or large commercial/industrial locations) and or substations or any interconnection where transmission meets distribution. Also, limited information is available to electric power consumers regarding their past, present, and future projected use of power with sufficient details to make informed choices about types of power supply and pricing alternatives, particularly below those aforementioned nodes where transmission meets distribution. Furthermore, retail electric providers (REPs) and even power grid operators in prior art systems and methods do not have access to data and analytics to provide optimal identification and management of distributed energy resources (DERs), and do not have the ability to provide advanced energy settlements to provide the lowest pricing for power supplied at predetermined times, due at least in part to costs associated with obtaining power agreements without access to the data and analytics that provide a reduced risk of capital and performance associated with the supply and demand sides. Thus, there remains a need for improved information, controls, real-time or near-real-time data on power consumption, and visualization of the same for electric power market participants, REPs, end use customers, data centers, and microgrid owners, and messaging and management of financial settlement therefor.

SUMMARY OF THE INVENTION

The present invention relates to electric grid management and visualization, and more particularly, to electric power topology and interactive graphical user interfaces (GUIs) that provide for modeling, introduction, operational command and control, market information for distributed resources of supply and demand or load acting as supply (controllable load resources responsive to energy management systems and their equivalents) and advanced energy settlements, messaging, and applications for electric power supply, load, and/or curtailment and data analytics associated with the distributed electric resources (DERs) for microgrids and broader electric power grids. Systems and methods for data analytics and customer or consumer guidance and controls are provided, and coupled with graphical user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kits, application web-based storefronts, and combinations thereof. Furthermore, the unique attributes associated with the above listed grid elements, systems and apparatus that influence where they are located on the grid, the availability of those resources to introduce supply or demand side power, the profiles of each of the grid elements, supply or demand, for those grid elements and the aggregation of same such that the aggregated information is used for control, dispatch, operating reserves, grid stability, reliability and shown in a GUI that allows an electric grid operator to take actions on the information provided.

The present invention provides for systems, methods, and GUI embodiments for providing electric power usage (past, current, and/or future projected) information, management, financial settlements, and messaging, and applications for DER and for interactive, dynamic (real-time) electric power topology GUIs as described herein.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 16 illustrates marketplace campaign information via the interactive GUI.

FIG. 18 continues to illustrate the proposed solar DER design for a predetermined address in FIG. 17 via the interactive GUI.

DETAILED DESCRIPTION

Figure 1:
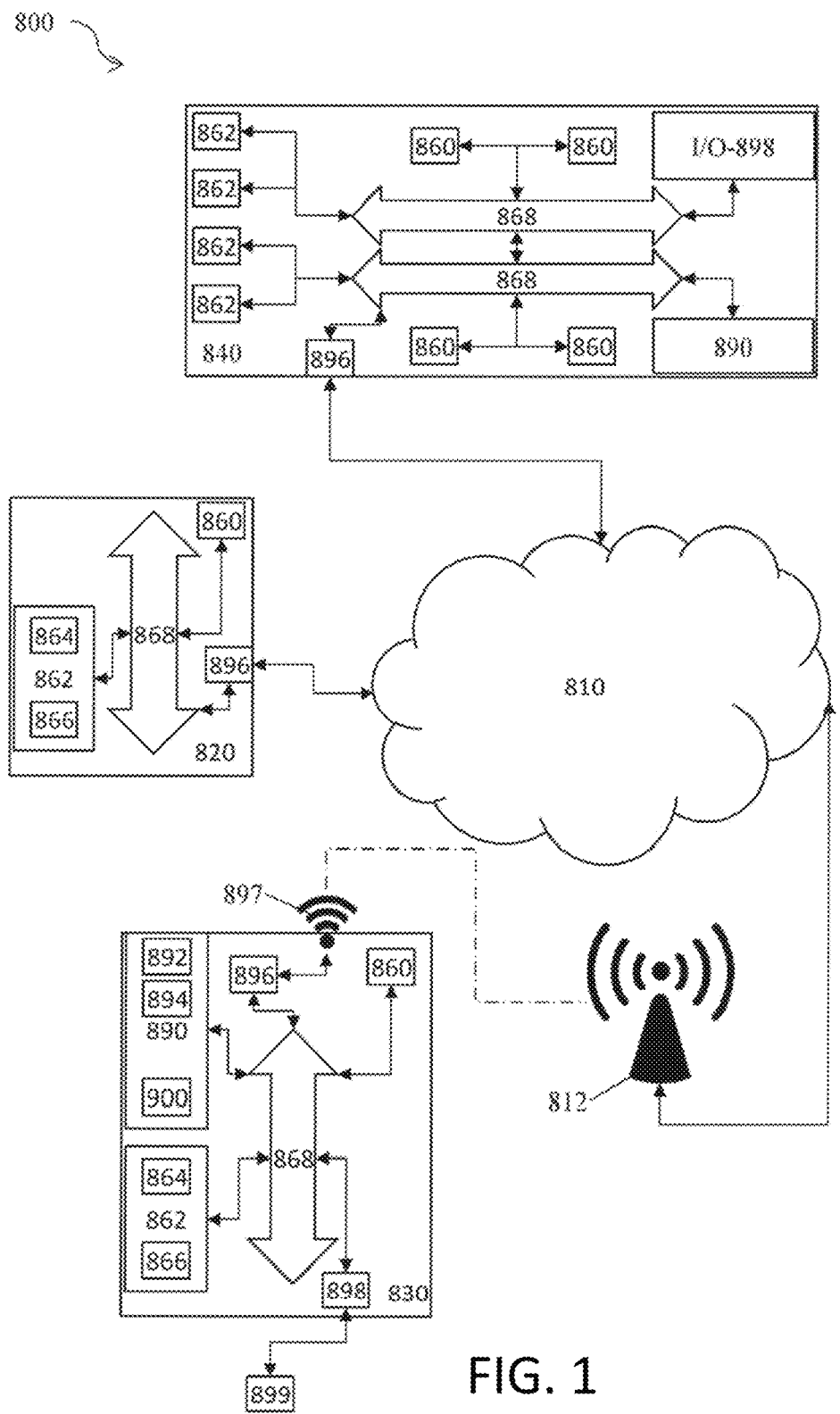
FIG. 1 illustrates a schematic diagram of an embodiment showing a configuration for a cloud-based computing system for user interface with the systems of the present invention.

Referring now to the drawings in general, the illustrations are for the purpose of describing preferred embodiment(s) of the invention at this time, and are not intended to limit the invention thereto. Any and all text associated with the figures as illustrated is hereby incorporated by reference in this detailed description.

The present invention provides systems and methods for data analysis, messaging, advanced energy settlements, command and control and management of electric power supply, demand, and/or curtailment including graphical user interfaces for consumers, including consumer profiles and alternative pricing programs and/or settlement programs for business and residential applications, including but not limited to graphical user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kits, application web-based storefronts, and combinations thereof. Apparatus embodiments are also provided in accordance with the systems and methods described herein.

Furthermore, novel methods of the present invention provide for consumer guidance and controls that are coupled with graphical user interfaces for mobile applications, websites, and computer displays that provide improved information and controls for consumers for electric power consumption and management of financial settlement therefor. Preferably, the customer sets their preferences through the user interfaces and then the customer's own data, including whether the customer has opted in for direct response participation, is used to make recommendations for grid elements, services, etc., to the end users.

In the description of the present invention, it will be understood that all EnergyNet embodiments and advanced energy settlements (AES) systems and methods descriptions include and incorporate by this reference without regard to individual, specific recitation for each example described, real-time and/or near-real-time data, including revenue grade metrology used for AES financial settlements. Revenue grade metrology data (regardless of whether a revenue grade meter is owned by the utility, market participant, REP, or customer owned reporting data to the aforementioned market participants or directly to the market itself), which a generic computer is incapable of using, is generated by active grid elements in the power grid; measured data is then transformed into settlement grade data for market financial settlement for load and supply. Additionally and similarly, real-time communication, messaging, and data packet transfer is provided over at least one network associated with the systems and methods of the present invention. This requires physical devices, including at least one client device and at least one server, communicating and interacting over the network. The present invention is necessarily rooted in computer technology in order to overcome a problem specifically arising in the realm of computer networks, more specifically, aggregating and integrating distributed grid element inputs for providing an interactive, geographic visualization of the electric power grid. Locating distributed grid elements and integrating them into the power model in real time could not have been done in the pre-Internet world. One embodiment includes the use of cloud computing technologies, the replication of the computer/storage systems and apparatus, the use of multiple processors and databases and the use of distributed application layers which are utilized for the described systems and apparatus.

This detailed description of the present invention includes energy financial settlements and messaging and/or data packet transfer or transmission, including the following issued patents and/or copending applications by common inventor and/or assignee Causam Energy, Inc.: 8849715, 8583520, 8595094, 8719125, 8706583, 8706584, 2014/

0180884, 8775283, 8768799, 2014/0279326, WO2014/066087, 2014/0039699, 2014/0277788, 2014/0039701, 8588991, 8761952, 2014/0277786, 2014/0277787, WO2014/022596, each of which is incorporated by reference in its entirety herein.

The systems and methods of the present invention also provide support and functionality for at least one distribution service provider through the market-based platform to allow communities, municipalities, cooperative power groups, and/or other combinations of persons or entities to be aggregated to form at least one distribution service provider, which exist within another distribution service provider, transmission/distribution service provider (TDSP), and/or utility. Additionally, a meter data aggregator (MDA) is provided to interface with the distribution service provider and power marketer and/or utility.

The present invention includes a multiplicity of interactive graphical user interfaces (GUIs) for all aspects of AES and/or EnergyNet embodiments. By way of example and not limitation, as illustrated in the figures, at least one GUI is provided for electric power consumption for business or commercial facilities, including information and/or controls wherein the GUI is provided for mobile applications, websites, terminal and/or computer displays, and combinations thereof. For mobile applications, one embodiment includes a mobile communication computer device, such as a smartphone, tablet computer, or other mobile smart interactive communications device (personal/wearable or portable), having an application including software operable on a processor coupled with memory, wherein the mobile communication computer device is constructed and configured for network-based communication within a cloud-based computing system as illustrated in FIG. 1.

FIG. 1 is a schematic diagram of an embodiment of the invention illustrating a computer system, generally described as 800, having a network 810 and a plurality of computing devices 820, 830, 840. In one embodiment of the invention, the system 800 includes a cloud-based network 810 for distributed communication via a wireless communication antenna 812 and processing by at least one mobile communication computing device 830. In another embodiment of the invention, the system 800 is a virtualized computing system capable of executing any or all aspects of software and/or application components presented herein on the computing devices 820, 830, 840. In certain aspects, the computer system 800 is implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, personal digital assistant (PDA), smart phone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 additionally includes components such as a storage device 890 for storing the operating system 892 and one or more application programs 894, a network interface unit 896, and/or an input/output controller 898. Each of the components are coupled to each other through at least one bus 868. The input/output controller 898 receives and processes input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that performs calculations, process instructions for execution, and/or other manipulations of information.

In another implementation, shown as 840 in FIG. 1, multiple processors 860 and/or multiple buses 868 are used, as appropriate, along with multiple memories 862 of multiple types (e.g., a combination of a DSP and a microprocessor, a plurality of microprocessors, one or more microprocessors in conjunction with a DSP core).

Also, multiple computing devices are able to be connected, with each device providing portions of the necessary operations (e.g., a server bank, a group of blade servers, or a multi-processor system). Alternatively, some steps or methods are performed by circuitry that is specific to a given function.

According to various embodiments, the computer system 800 operates in a networked environment using logical connections to local and/or remote computing devices 820, 830, 840 through a network 810. A computing device 830 connects to a network 810 through a network interface unit 896 connected to a bus 868. Computing devices communicate communication media through wired networks, direct-wired connections, or wirelessly, such as acoustic, RF, or infrared, through an antenna 897 in communication with the network antenna 812 and the network interface unit 896, which includes digital signal processing circuitry when necessary. The network interface unit 896 provides for communications under various modes or protocols.

In one or more exemplary aspects, the instructions are implemented in hardware, software, firmware, or any combinations thereof. A computer readable medium provides volatile or non-volatile storage for one or more sets of instructions, such as operating systems, data structures, program modules, applications, or other data embodying any one or more of the methodologies or functions described herein. The computer readable medium includes the memory 862, the processor 860, and/or the storage media 890 and is a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further transmitted or received over the network 810 via the network interface unit 896 as communication media, which include a modulated data signal such as a carrier wave or other transport mechanism, and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disk, or other magnetic storage devices; or any other medium that is able to be used to store the computer readable instructions and which is able to be accessed by the computer system 800.

It is also contemplated that the computer system 800 does not include all of the components shown in FIG. 1, includes other components that are not explicitly shown in FIG. 1, or utilizes an architecture completely different than that shown in FIG. 1. The various illustrative logical blocks, modules, elements, circuits, and algorithms described in connection with the embodiments disclosed herein are implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans are able to implement the described functionality in varying ways for each particular application (e.g., arranged in a different order or partitioned in a different way), but such implementation decisions should not be interpreted as causing a departure from the scope of the present invention.

Visibility and control of DER assets within microgrid and electric power grid environments are provided by the systems and methods of the present invention. Data from distributed energy resources (DER) are provided in at least one map layer, including but not limited to at least one base map layer, at least one thematic map layer, and integration with satellite images and topographical map resources in a cloud-based computing network.

The present invention provides for a power model in a cloud-based computing system with a persistent global power model that shows how microgrids, grids, and grid elements are configured and connected in a topology. An electric power topology is a global power model and map that is accessible, visible, and usable by any participants in the electric power grid. Interconnected sub-topologies of the electric power topology are adapted for use in business activities and business models to support improvement, command, control, and metrics of the electric power grid and grid elements active thereon.

In one embodiment of the present invention, a remotely controllable and/or directly controllable DER, controlled by an apparatus either directly coupled or cloud based that instructs the DER to integrate and operate with the grid and measured by a meter/switch/controller integrated device operable for measuring and reporting wirelessly the real-time voltage information. The meter/switch integrated device is activated by plugging it into a wall socket within any building that provides for measurement with switches to connect and disconnect grid elements. The following information is provided in one output of this device: real-time voltage data and profile information, tap changes at substation level, and motor starting events on neighboring device behavior if on the same distribution transformer.

For example, when the meter/switch integrated device is plugged in and connected to a UPS battery or other electric power storage or fuel cell that is connected to a load, such as by way of example and not limitation, an entertainment system, the consumer user remotely controls the switch via a software application (or App) operable on a smart phone or mobile computing device to command and control the flow of electric power from the battery or from the electric power grid or microgrid that provides power to the building or device, and to switch between them without disrupting the normal operation of the microgrid or electric power grid or damaging the load or power consuming device. Alternative power sources for DER, including but not limited to solar, wind, geothermal, fuel cell, hydrogen, mobile electric storage or battery, and combinations thereof, are operable with the systems of the present invention for the metering, switching, secure and wireless communication of revenue grade metrology and other meter data, and command and control directly or remotely via secure apps.

Cartography

Power networks are described in geographical locations traditionally (i.e., in a map). However, distribution lines and grid elements are not available in any consistent or accurate and interactive map to date. The present invention provides for geocoding of distribution infrastructure and any active grid elements, as well as both static and dynamic visuals of the electric power topology using graphical user interfaces (GUIs). For example, transmission line assessment information is incorporated into the system of the present invention along with topological information. The geocoding information is secure and is anonymized relative to the city center when determining exact locations for these active grid elements.

In the meter environment described in the foregoing, a voltage sag or spike is identified in a dynamic electric power map with the real-time data inputs from active grid elements in the system and methods of the present invention.

The gamification of power implementation of the systems and methods of the present invention provides for distributed grid element identification and information capture activity using crowd-sourced data to locate DER assets, loads, and other grid elements, including but not limited to transmission and/or distribution lines for electric power grid mapping. In one gaming example, short bursts of focus and activity (e.g., about 10 minutes but not bounded by a specific time interval) are provided in a remote gaming system to identify grid elements within a certain area to determine dynamic electric power grid components over a topographic map, providing a "game of power" with a user interface on mobile computing devices or smartphones. Zones are opened for approximately 10 minute periods; individual players use their phones and the App operable on it to view a satellite map, scan the map, and identify, mark, and/or tag grid elements (e.g., solar panels or arrays, wind power elements, back-up generation DER, and combinations thereof) on the map.

Identification of the grid elements is rapidly established to provide accurate, more granular data about a multiplicity of grid elements, including but not limited to distributed energy resources (DERs), electrical bus, transmission and/or distribution related components, measurement and verification components, etc., for geographic map information usable within the electric power topographic map (static) that when combined with grid element data in real-time is automatically integrated to provide a dynamic electric power topographic map that is viewable in displays of distributed computing devices connected to the network and cloud-based system of the present invention. Thus, the gaming of the present invention provides for crowd-sourced data from gaming outputs for identifying grid elements to populate the electric power topology as well as opportunity zones for enrolling DER grid elements in command and control metering/switching as described in the foregoing.

Figure 2:
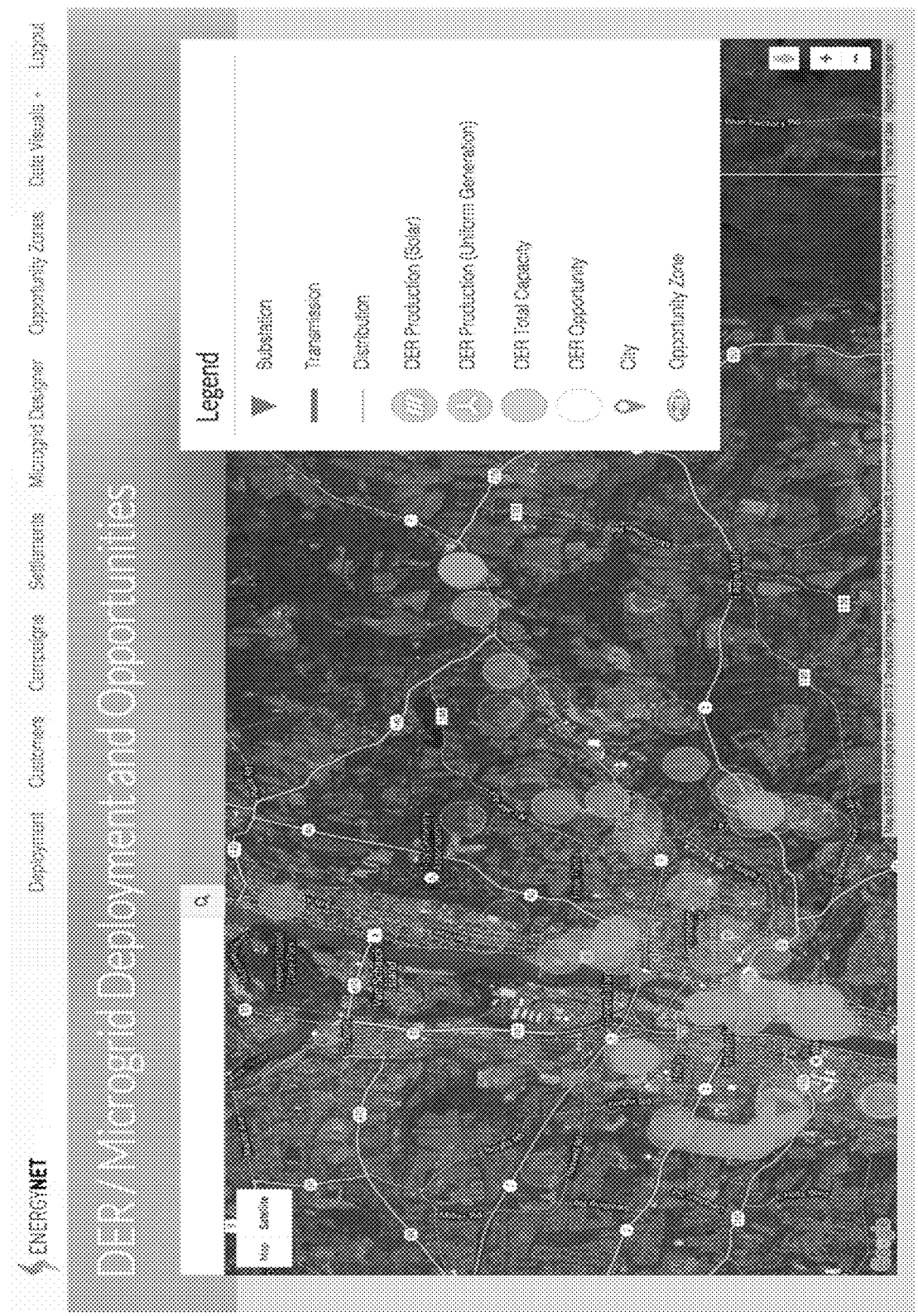
FIG. 2 illustrates a GUI for viewing Distributed Energy Resource (DER) and microgrid deployment and opportunities for a utility operator.

A graphical user interface for an Independent System Operator (ISO) to view Distributed Energy Resource (DER) and microgrid deployment and opportunities is illustrated in FIG. 2. The graphical user interface includes satellite imagery to zoom in and out, and at the right zoom level, the utility transmission infrastructure inputs are visually represented on a hybrid satellite map, which further includes grid elements. While this is able to be visualized in a static view, also preferably, a dynamic view is provided to indicate information and data from real-time metering and grid element activity. By way of example and not limitation, aggregation of DER and its participation in microgrid and/or broader electric power grid are provided in dynamic visualization of the electric power grid over a topographic map.

The electric power topographic map is used within a distribution resource plan that covers all major utility zones, microgrids, data centers, and combinations thereof, from high level transmission to distribution lines, including interconnects, substations, and down to grid elements. This EnergyNet system of the present invention renders the electric power topographic maps, and provides both static and dynamic views in real time. For example, the electric power topographic map of the present invention shows how many megawatts are introduced at each feeder by each DER or power source type and their contribution and availability, and also creates a new "model" that allows at least one grid operator to model below the transmission level or to aggregate the impact of DER assets into existing models.

The electric power topographic map inputs into dynamic power flow modeling, control, and simulation, for example, used within Paladin software provided by Power Analytics Corporation, including U.S. Pat. Nos. 7,826,990, 7,844,439, 7,840,395, 8,229,722, 8,959,006, 8,126,685, 7,729,808, 7,840,396, 7,844,440, 8,170,856, 7,693,608, 8,180,622, 8,775,934, 8,131,401, 8,155,943, 8,868,398, 8,165,723, 8,494,830, 8,401,833, 8,577,661, 8,155,908, 8,688,429, 8,321,194, 8,036,872, 9,111,057, 9,031,824, and 9,092,593, each of which is incorporated by reference herein in its entirety.

Utility data that is published is integrated with the aggregation circles provided by the electric power topographic map of the present invention. In one interactive GUI, the utility controller selects a specific feeder to see how many DERs are connected and participating (dynamic, in use); this information is viewable on the electric power topographic map of the present invention. By contrast to prior art, where controllers in utility control center have to guess and use trial-and-error to address issues within the power grid, the present invention includes digital contracts, which replace traditional or standardized contracts used for providing supply or load between market participants and the electric power markets, for activation and compensation of available DER through EnergyNet systems and methods, overall capacity, what DER is in use, etc., for automated demand response events based upon the estimated time of restoration for clearing alarms.

In another example, in the Oakland area visual, a substation level view with real-time network information from gateways and a DER interconnect model that is static is able to be integrated into the electric power topographic map (white triangles indicate DERs selling power back to the grid); this real-time data on top of a real-time power model gives the utility an unprecedented view, by substation and by feeder line, especially when providing for real-time what-if scenario analysis and load prioritization. It also allows the utility controller to change the run mode on individual assets within a distribution network and power model.

The low level power substation modeling is provided with an anonymized distribution level model in DesignBaseXI or any engineering tool accepted by a utility, market participant or grid operator, where grid elements are modeled for their electrical and engineering performance characteristics so they are able to simulate and build those distribution supply or apparatus necessary to interconnect to the electric power grid. Grid element catalogs are brought into the model, plus full distribution level model and short circuit analysis, power flow, simulations and all grid elements from the catalog and identified within the grid or microgrid are provided with the present invention.

In an IKEA example, the game of power was used to identify the DER (solar panels) located using satellite imagery, calculate the size and number of panels, and determine a 540 kW array deployment on top of the IKEA building, which was determined to be accurate within 2 kW of the specification of the actual installation. The gamification of power implementation provides a map layer of the electrical components on a map, including everything active and running (by feeder), generation type blend, power flow, and command and control of the DER assets based upon decisions made within the power model.

Digital contracts are used within the systems and methods of the present invention to provide for automated service level agreement modeling on grid elements within a microgrid or grid, so the grid operators count on them as firm resources available for deployment. Historical performance and participation in load control events are also provided as inputs for each DER asset. Thus, automated command and control of individual and/or aggregated DER assets are provided. Also, advantageously, market-based financial settlements for those DER assets are automatically provided through the digital contracts and revenue grade metrology provided for the participation of the DER assets in any load control event or other use of the DER assets in the normal or emergency operation of the microgrid or grid.

The figures include GUIs described within the detailed description and illustrate various exemplary aspects of the present invention, and are not intended to limit the invention exclusively thereto.

FIG. 2 illustrates an interactive GUI for viewing Distributed Energy Resource (DER) and microgrid deployment and opportunities for a utility operator. The utility or grid operator includes control room personnel responsible for maintaining day to day operation and long term strategy and planning of power network operation. This function make be provided by an ISO or other market participants or any entity approved by NERC or FERC to manage grid operations. An electric grid operator has a view of all discovered and registered DER and microgrids layered on top of a satellite image on the interactive GUI. A utility operator also sees opportunities that have been identified where customers are interested in installing new behind meter generation capability on the interactive GUI.

Figure 3:
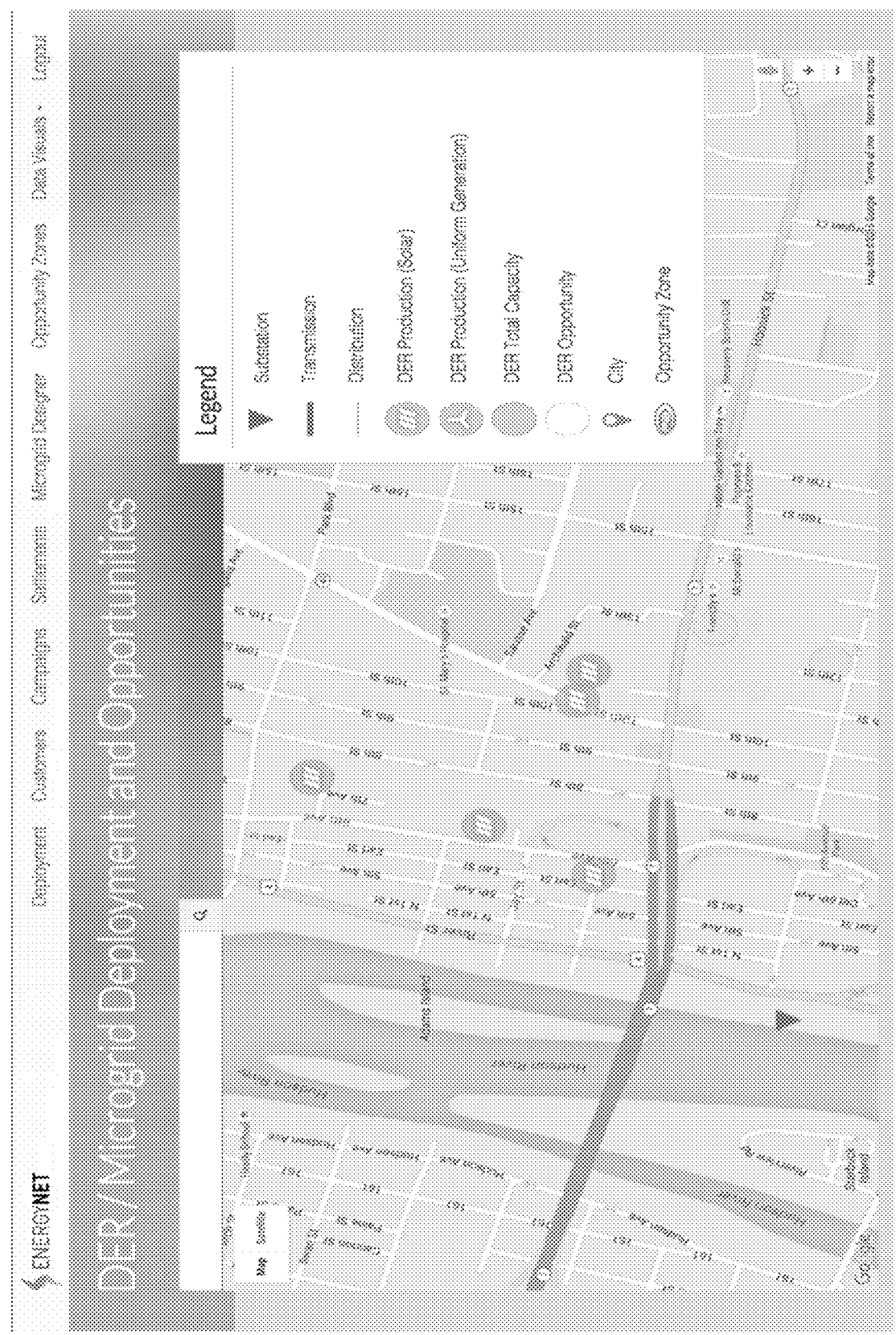
FIG. 3 illustrates a zoomed-in view of a DER/microgrid deployment and opportunities map.

FIG. 3 illustrates a zoomed-in view of a DER/microgrid deployment and opportunities map. The interactive GUI enables a utility operator to zoom in to a specific section of a city and view the map in street mode. DER assets are identified on the map view by generator type and also displayed side by side with utility infrastructure, including substations.

Figure 4:
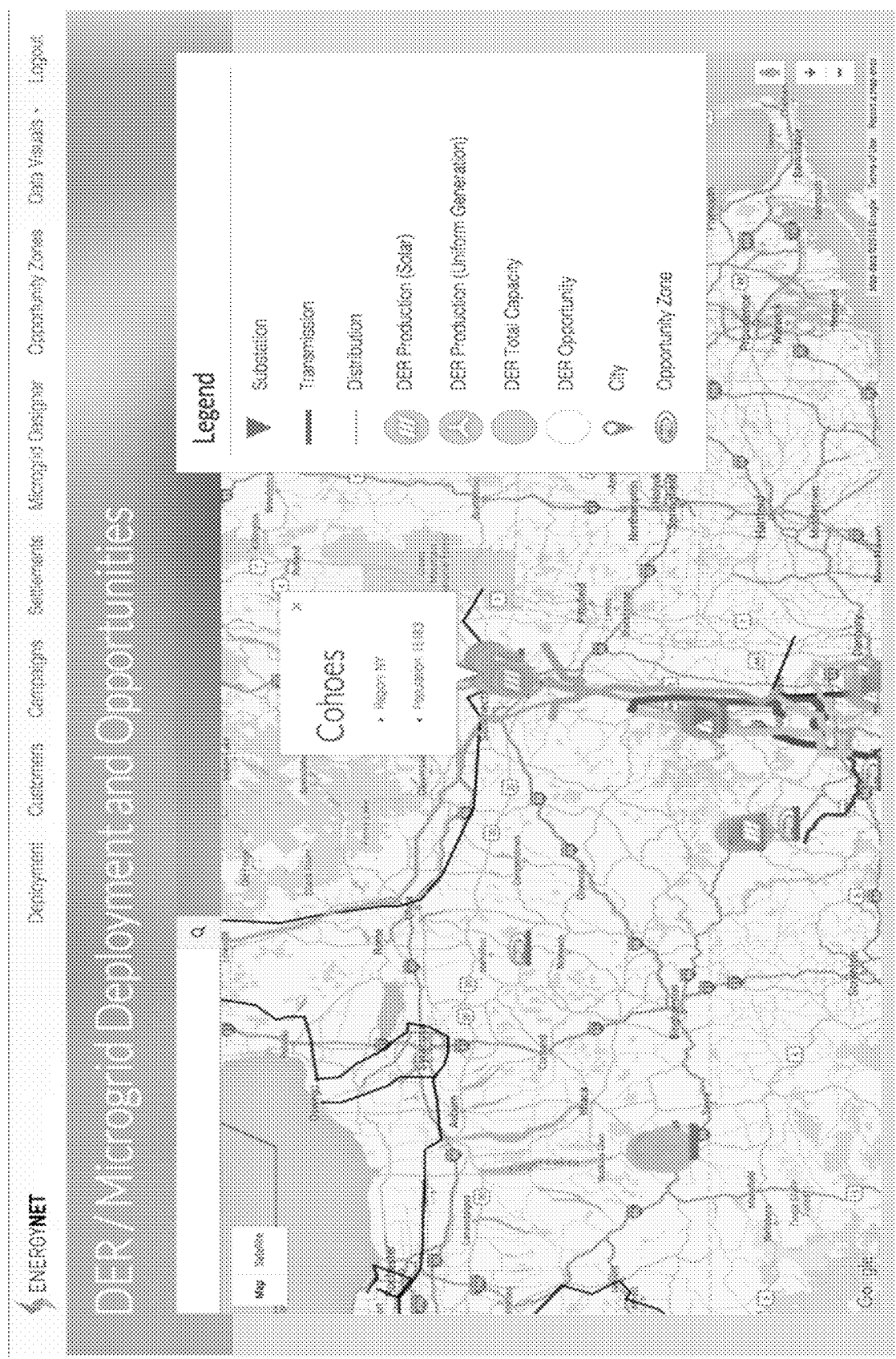
FIG. 4 illustrates a zoomed-out view of a DER/microgrid deployment and opportunities map.

FIG. 4 illustrates a zoomed-out view of a DER/microgrid deployment and opportunities map. The interactive GUI enables a utility operator to zoom out the map and see all identified DER assets within a market area or wider utility zone. Utility network information regarding transmission is overlaid side by side with DER assets.

Figure 5:
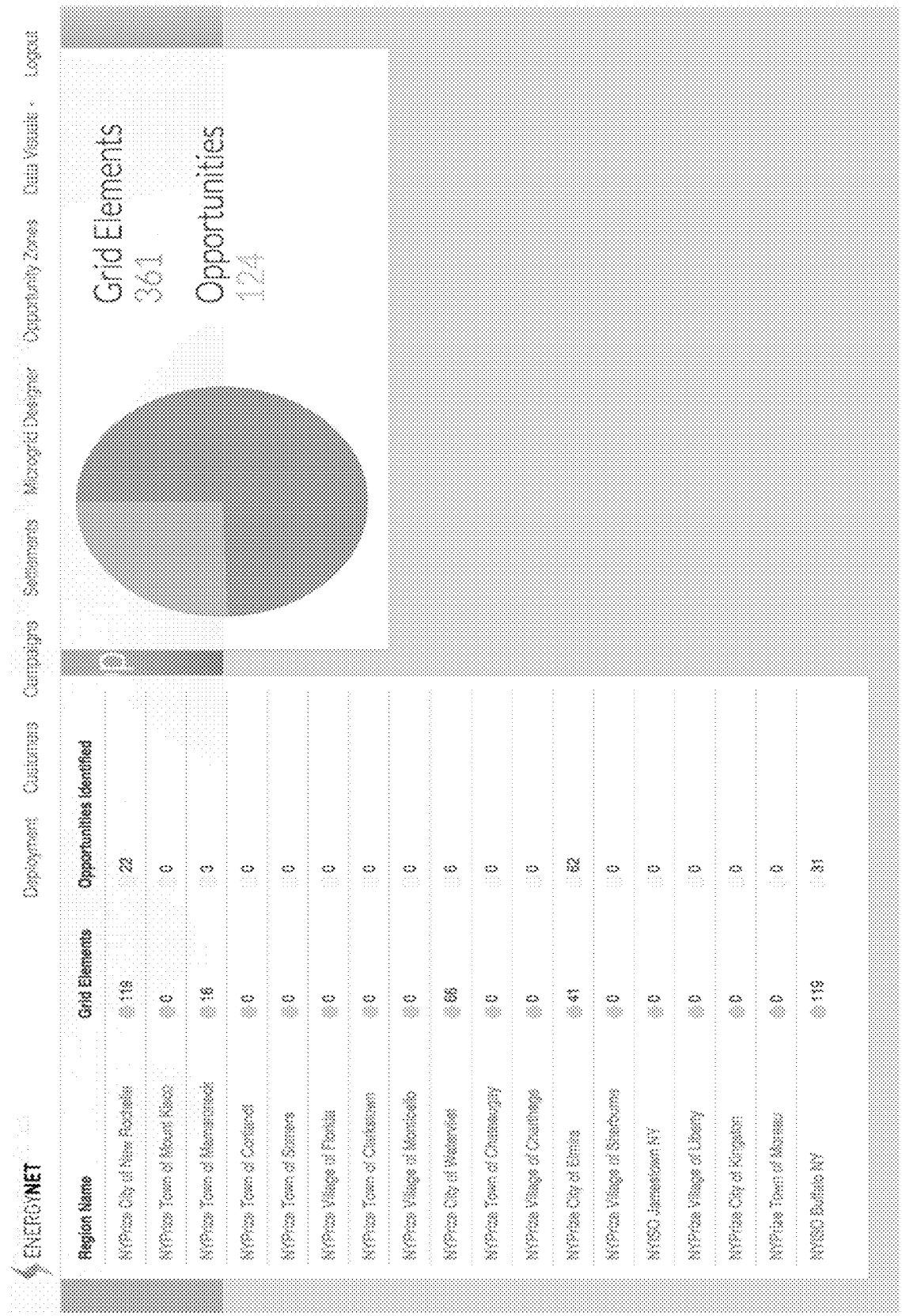
FIG. 5 illustrates data visuals of a DER/microgrid deployment and opportunities.

FIG. 5 illustrates data visuals of a DER/microgrid deployment and opportunities. The data visuals provide a utility operator with a tabular view and a data aggregation visualization of the number of DER elements and installation opportunities broken down by opportunity zone, city, or region.

Figure 6:
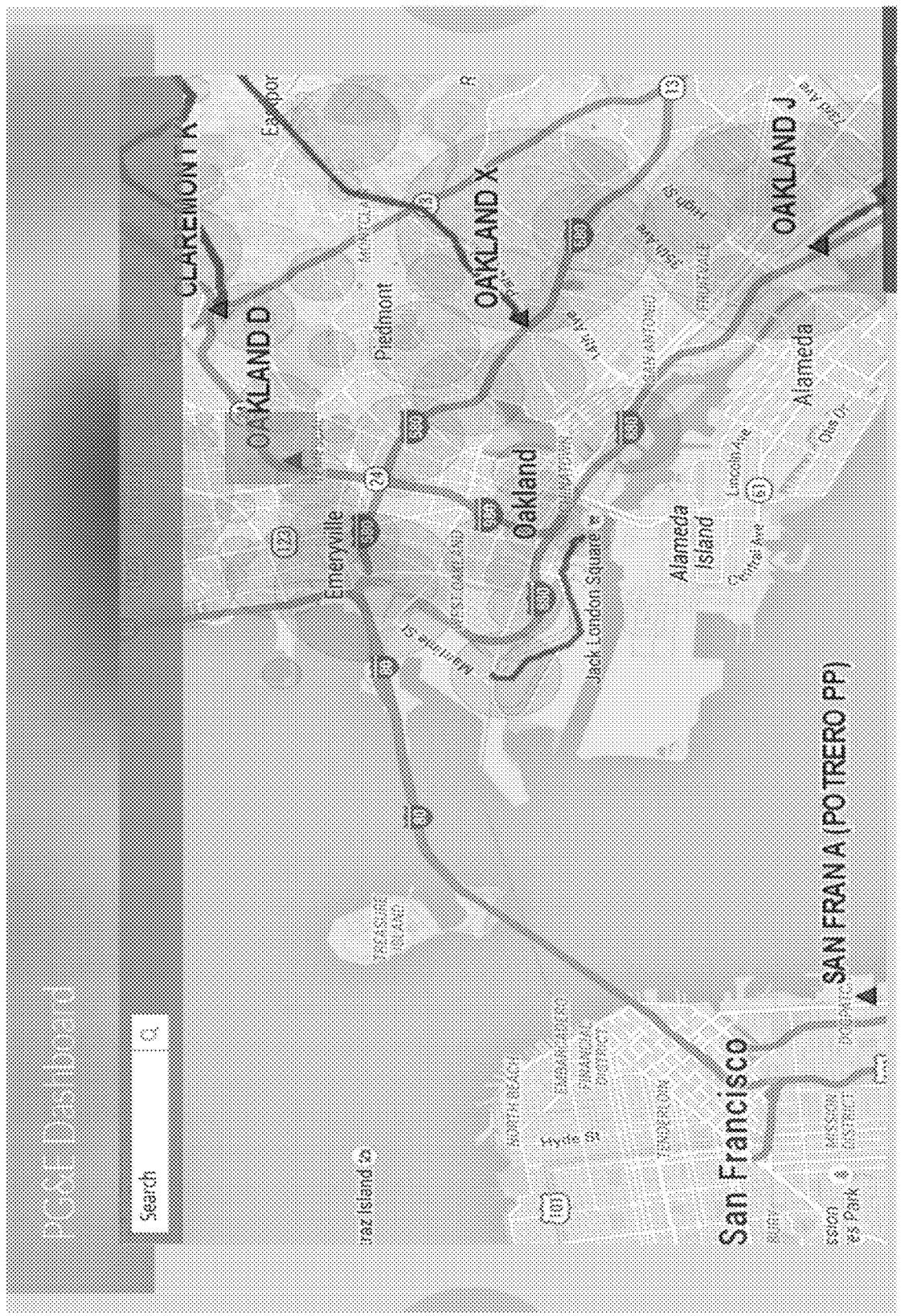
FIG. 6 illustrates an example of a utility control dashboard showing a geographical map with static transmission line data overlaid.

FIG. 6 illustrates an example of a utility control dashboard showing a geographical map with static transmission line data overlaid. Such a dashboard enables a utility operator to explore any zone. Areas where the regulatory body has enforced the release of transmission and distribution maps provide the greatest opportunity to connect asset and property owners with their local power network.

Figure 7:
FIG. 7 is a screenshot illustrating DER production capacity versus use and DER production by substations for a selected region from the map of FIG. 6.

FIG. 7 is a screenshot illustrating DER production capacity versus use and DER production by substations for a selected region from the map of FIG. 6. A utility operator sees a data aggregation visualization of real-time information of the DER within a zone that is currently providing power services back to the distribution network. The EnergyNet system of the present invention automatically adjusts the run time parameters and set points for aggregates of DERs to respond to critical events like "under voltage" and indicate an estimated restoration time.

Figure 8:
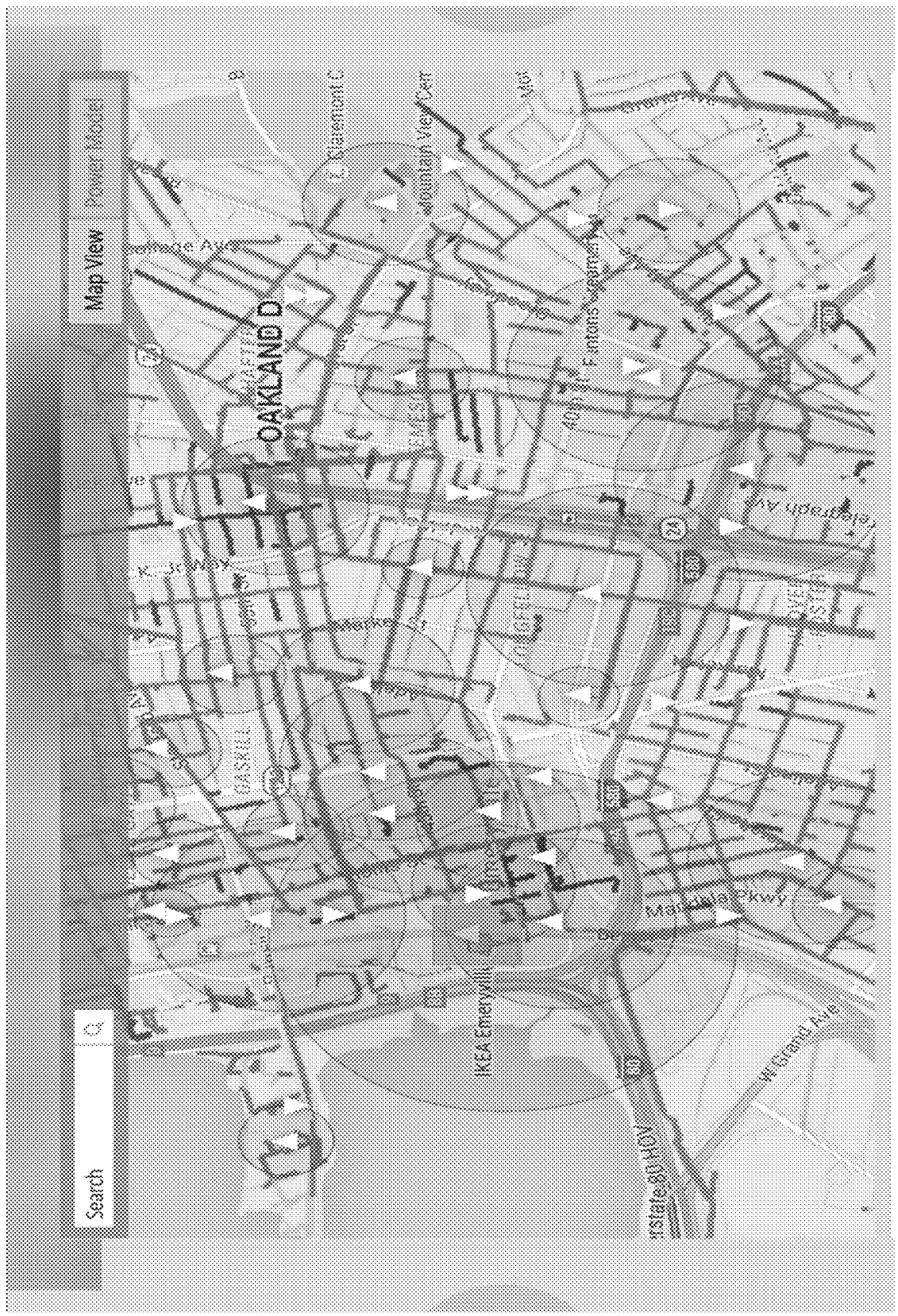
FIG. 8 illustrates a dynamic view of the electric power grid over a topographic map showing the distribution network and real-time DER power flow information.

FIG. 8 illustrates a dynamic view of the electric power grid over a topographic map showing distribution network and real-time DER power flow information. A utility operator zooms in to the distribution network to view a static power model, plus view real-time DER power flow information captured from the EnergyNet connected meters on each device and service entrance. The real-time data informs the power model, allowing for the continuous recalculation of new outputs and providing updated recommendations. The white triangles on the map indicate locations where a DER is selling power back to the grid.

Figure 9:
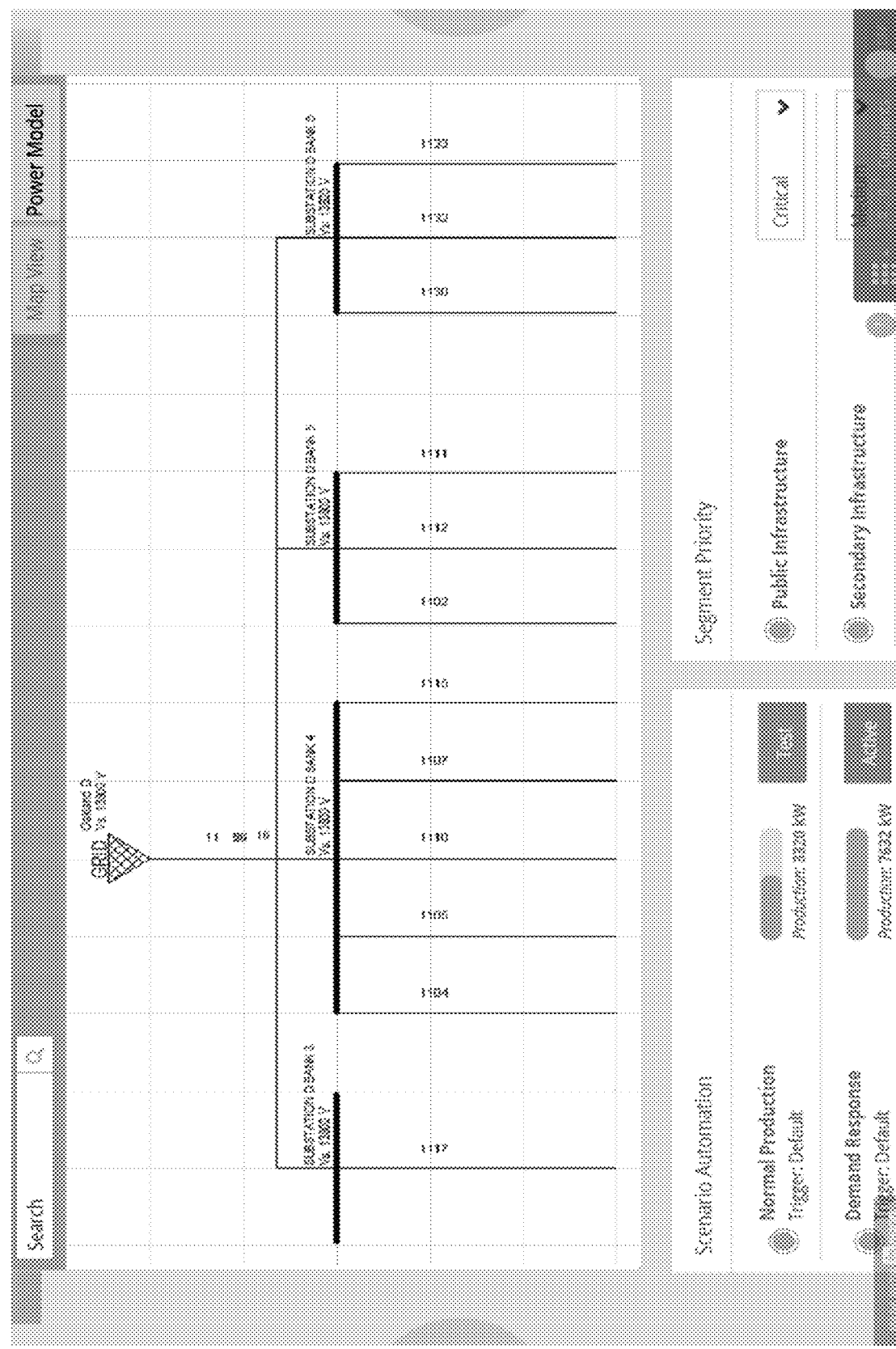
FIG. 9 is a screenshot of a distribution level power model.

FIG. 9 is a screenshot illustrating a distribution level power model. A utility operator quickly views the distribution level power model, below the substation level, and view specific feeders, circuits, load banks, and transformers. The real-time meter data collected from all EnergyNet Grid Elements inform the power model. Loads are prioritized by critical infrastructure, and generation assets are quickly tested based on operator defined performance and service agreements.

Figure 10:
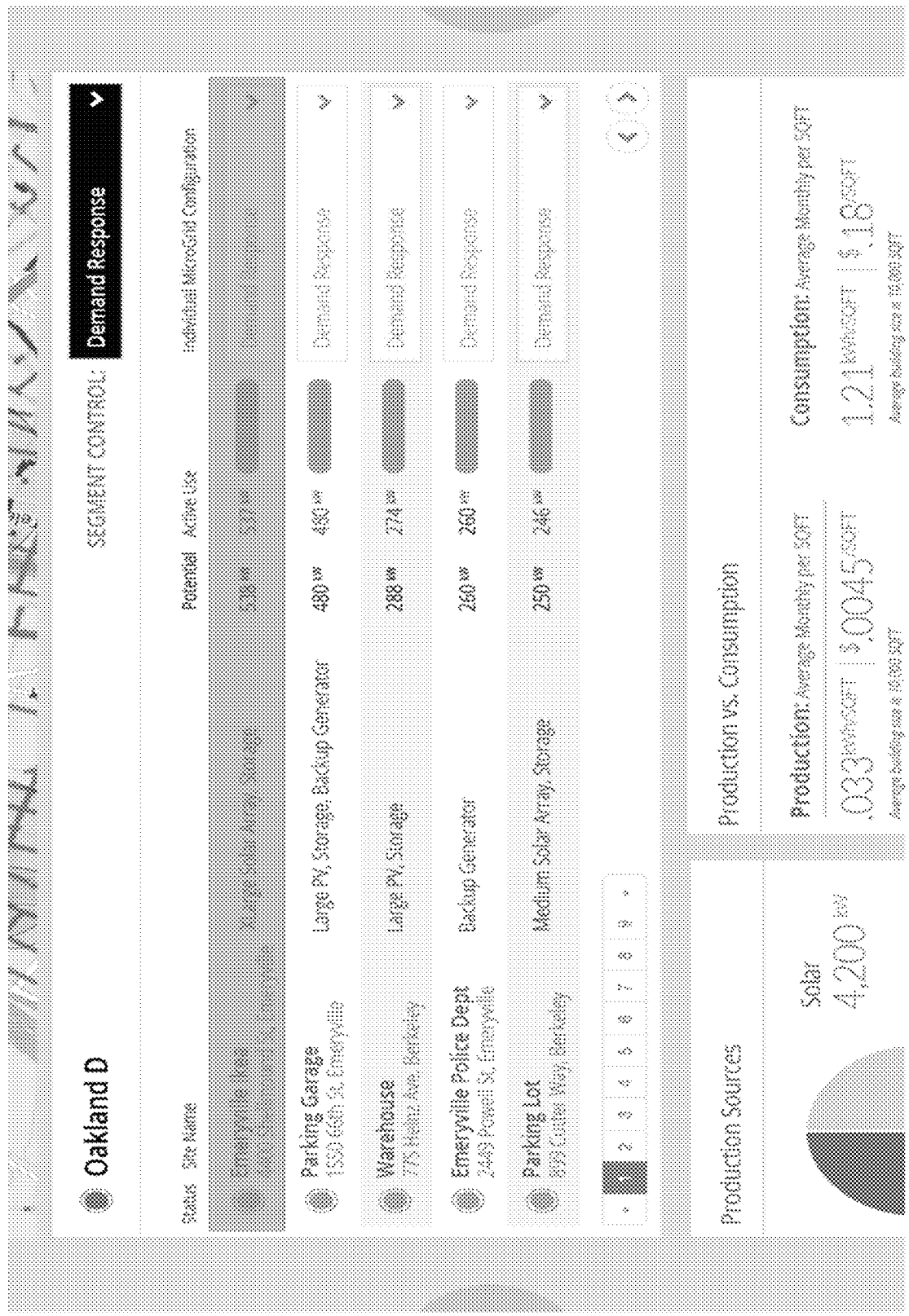
FIG. 10 is a screenshot illustrating demand response resources in an area.

FIG. 10 is a screenshot illustrating demand response resources in an area. A utility operator views a detailed table of all registered DER assets and alter the run mode and set point for each asset individually or as an aggregate within a region. Aggregated visualizations on generation type blend, market cost, and usage/production information are readily available.

Figure 11:
FIG. 11 is a screenshot illustrating the information of an individual asset for demand response in the area of FIG. 10.

FIG. 11 is a screenshot illustrating the information of an individual asset in the area of FIG. 10. The individual asset is working under normal operation; and its solar energy production is displayed. A utility operator zooms down into the deepest level to an individual asset to see real-time production and load flow information, satellite imagery, available generation sources, and a digital power contract including Risk, Cost, and Settlement information for any DER or microgrid providing services back to the distribution net.

Figure 12:
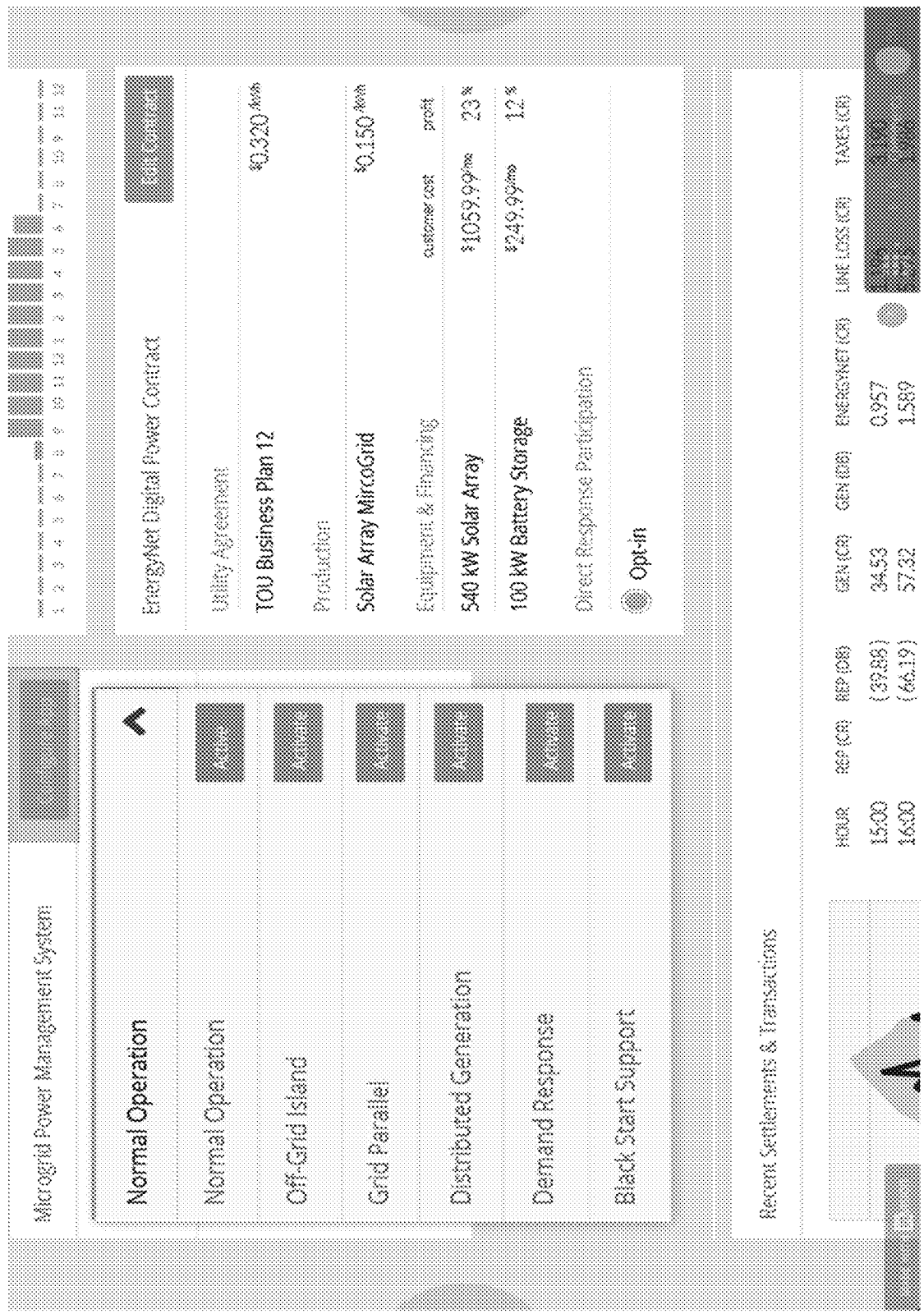
FIG. 12 is a screenshot illustrating additional information related to the individual asset for demand response in FIG. 11.

FIG. 12 is a screenshot illustrating additional information related to the individual asset for demand response in FIG. 11. The microgrid power management system configures the individual asset to an operational mode other than normal operation, for example, off-grid island, grid parallel, distributed generation, demand response, and black start support. A utility operator quickly changes the run mode, set point, or ancillary service provided for each individual asset. The digital contract indicates that the site has opted in for direct response participation; market-based financial settlements for services under contract are provided on a 15 minute, hourly, or daily settlement basis.

Figure 13:
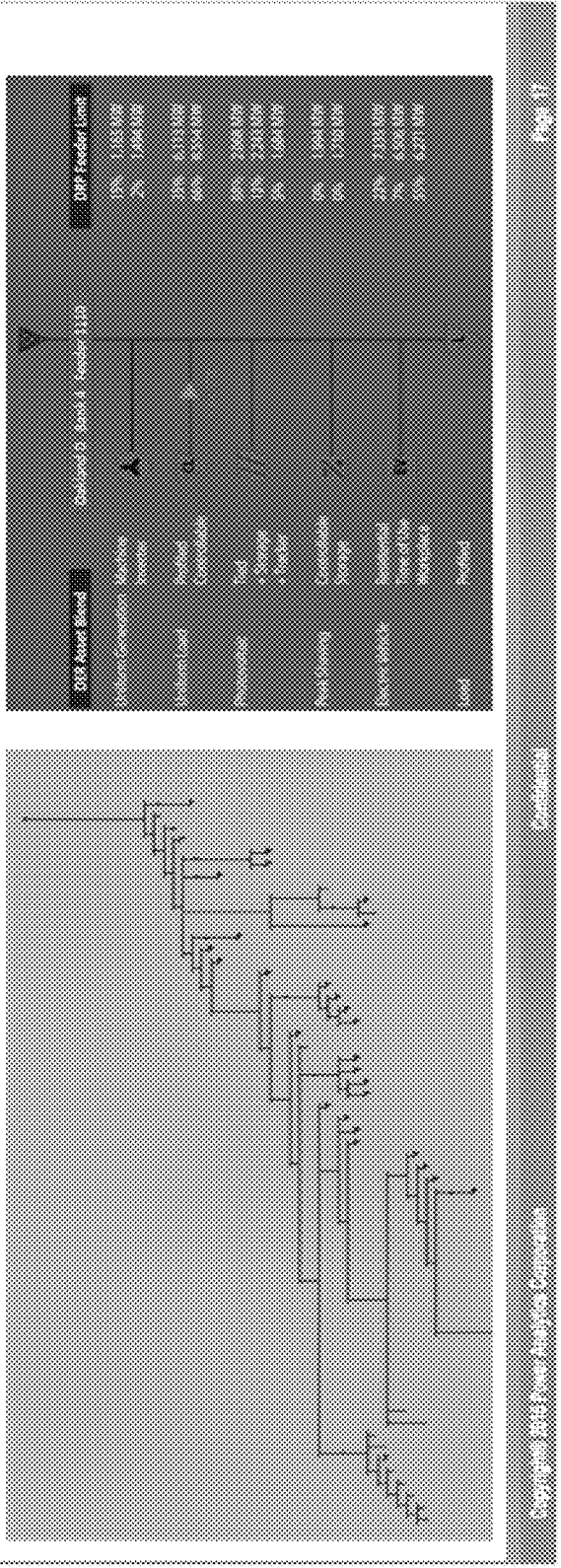
FIG. 13 illustrates distribution level power modeling on a commercial basis.

FIG. 13 illustrates distribution level power modeling on a commercial basis. It demonstrates utility command and control of distribution assets in a secure cloud. EnergyNet and Microgrid Power Management System provide modeling and operational recommendations for distributed assets that exist within the distribution network using total capacity, run time, economic, communication capabilities, and fuel mix parameters.

Figure 14:
FIG. 14 illustrates load profile and power production information related to a digital contract for a specific site.

FIG. 14 illustrates load profile and power production information related to a digital contract for a specific site. The EnergyNet system of the present invention provides each site with a digital contract that sets the parameters on their participation and capacity production. The EnergyNet system tracks individual site performance against targets to determine a risk and performance metric. Risk are aggregated across the entire DER portfolio to represent operational execution probability.

Figure 15:
FIG. 15 illustrates customer information in a certain area via the interactive GUI.

FIG. 15 illustrates customer information in a certain area via the interactive GUI. A service provider (e.g., equipment manufacturers, sales engineers, power consultants, or any third party wishing to offer items to retail customers) browses an anonymized list of customers provided by a retailer to pick customers to target with a specific offer or service. The service provider searches customers based on key words, for example, zip code. Customers are listed with relevant information such as address, meter status, meter type, client type (commercial or residential), billing status, upgrades opt-in, building size, monthly cost, monthly consumption, cost per square foot, industry type, etc.

Figure 16:
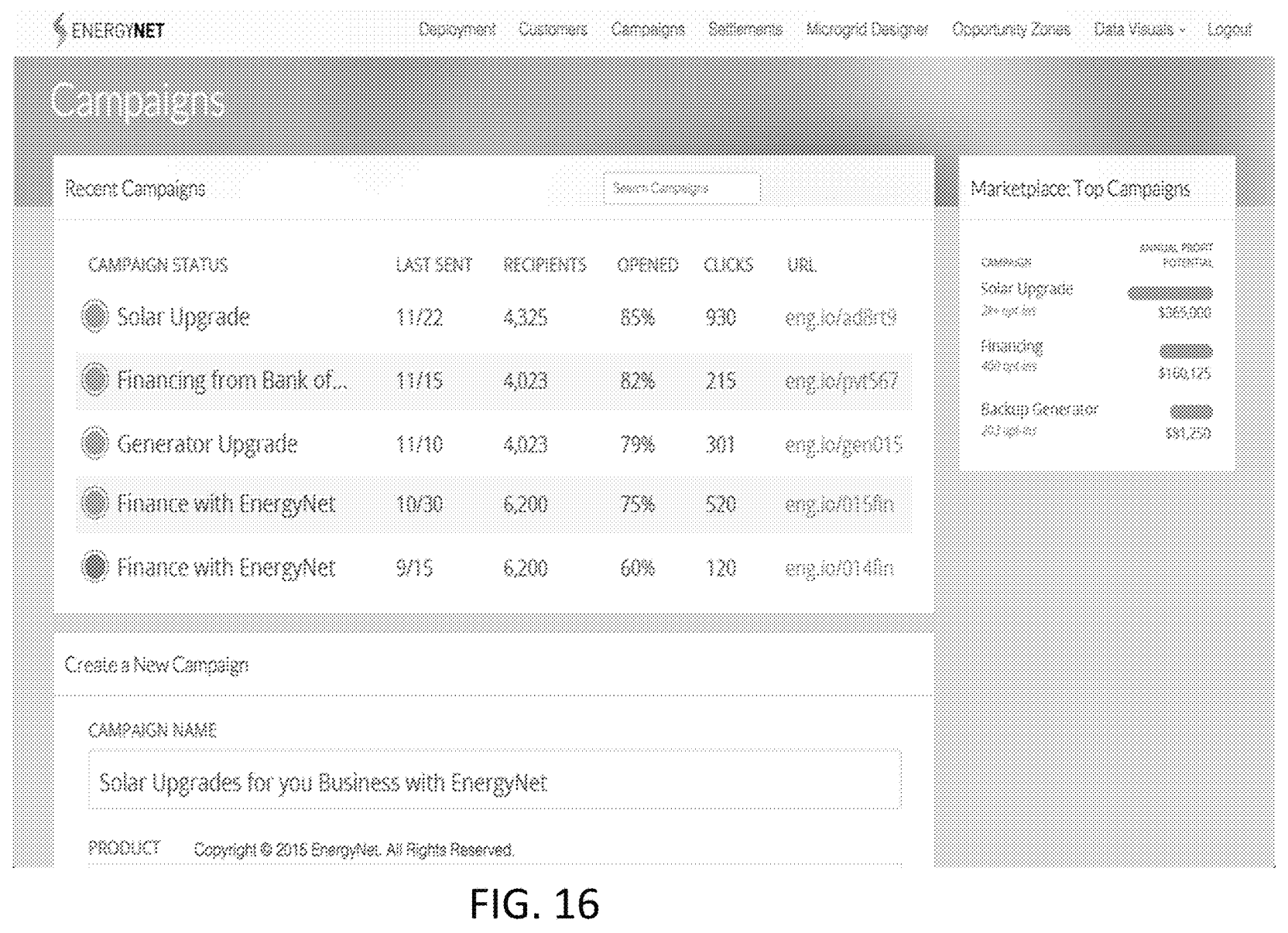

FIG. 16 illustrates campaign information via the interactive GUI. A service provider or hardware Original Equipment Manufacturer (OEM) marketing specialist views existing marketing and offer campaigns, see view and click-through results, and create and schedule new offer campaigns for goods and services.

Figure 17:
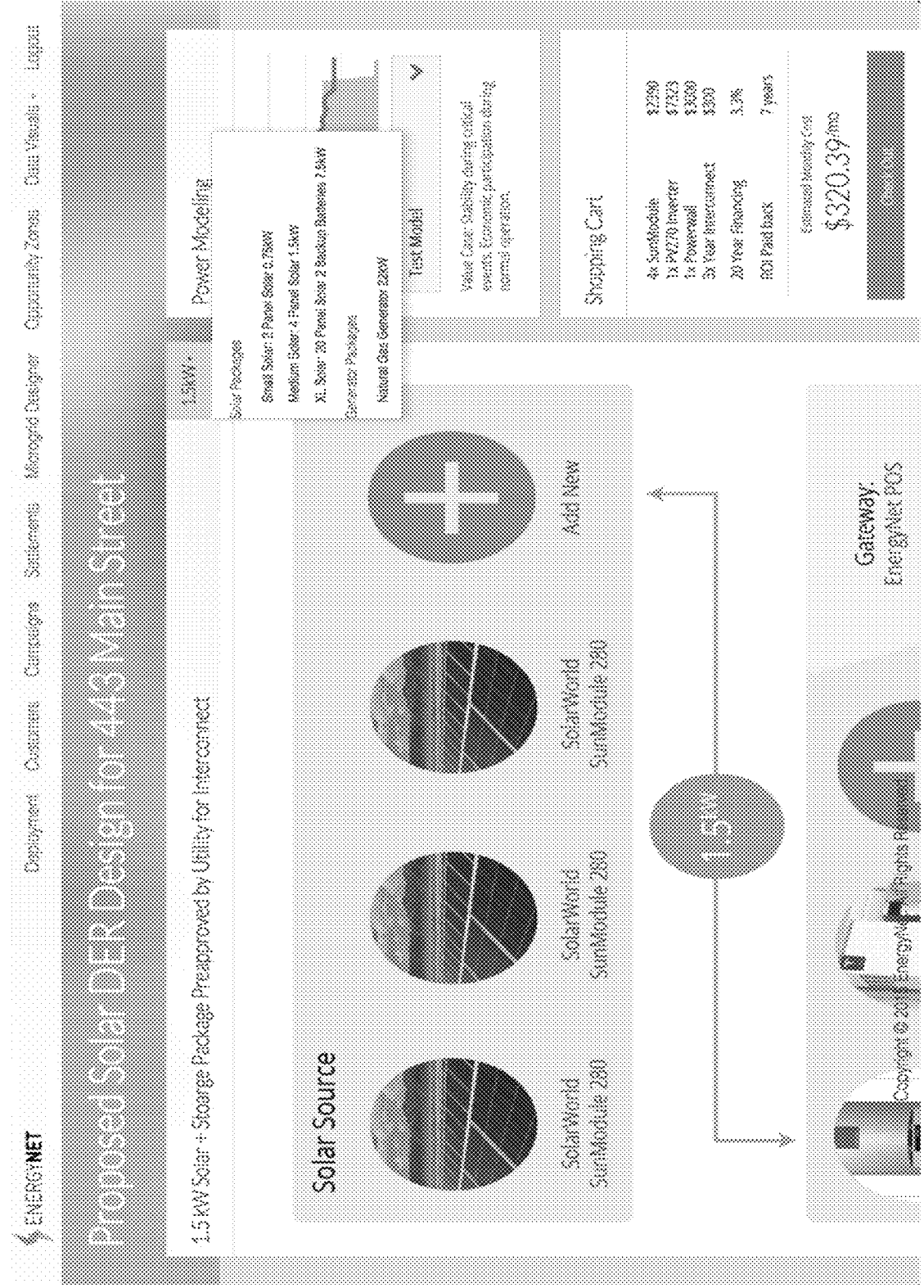
FIG. 17 illustrates a proposed solar DER design for a predetermined address via the interactive GUI.

FIG. 17 illustrates a proposed solar DER design for a predetermined address via the interactive GUI. A service provider advises a building owner interested in making a full DER upgrade on the type of equipment, interconnect agreement, and communications gateway in light of the power model, forecasting, cost, and anticipated return on investment. Certain packages have been pre-approved for interconnect and are recommended.

Figure 18:
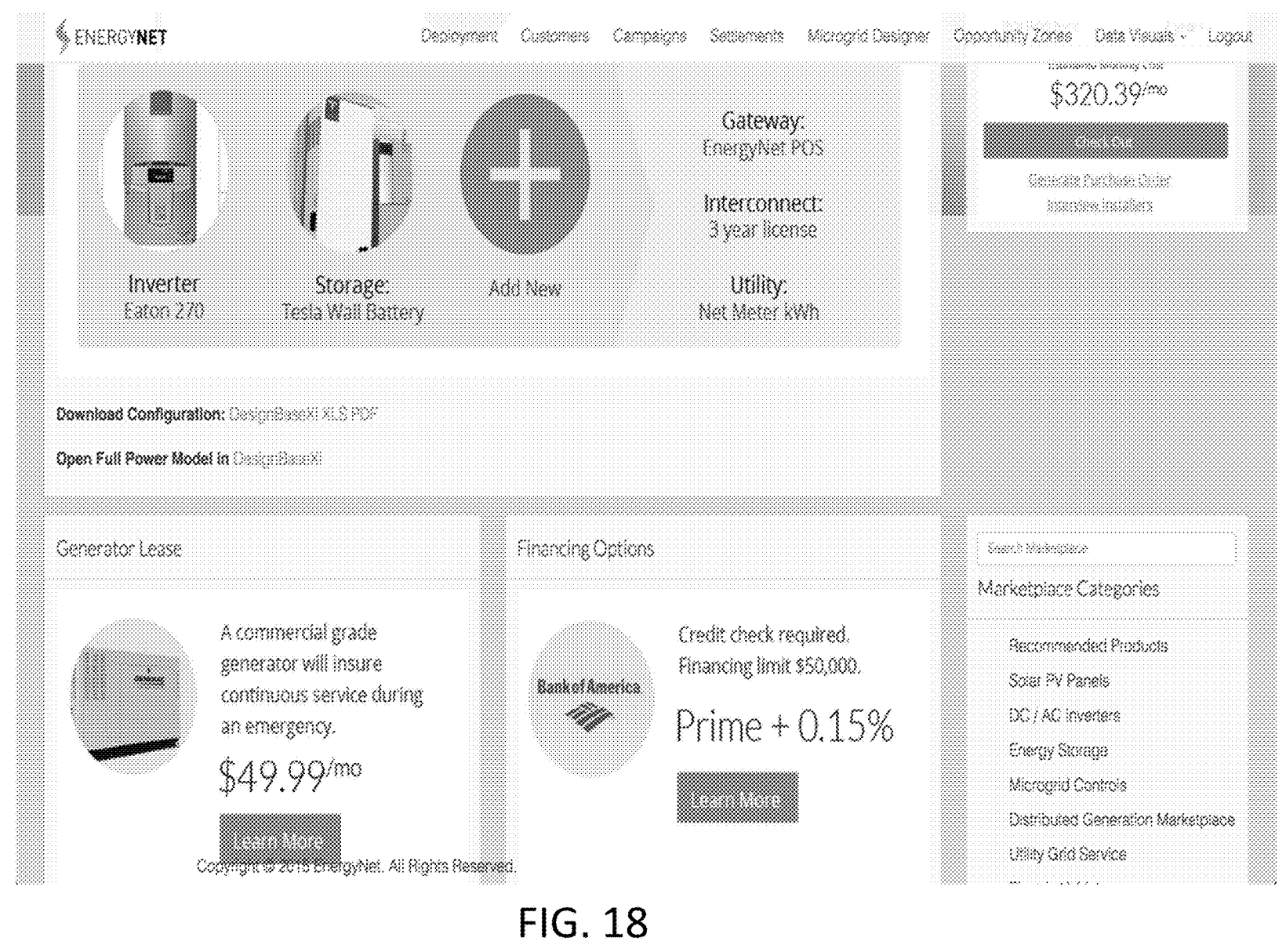

FIG. 18 continues to illustrate the proposed solar DER design for a predetermined address in FIG. 17 via the interactive GUI. The service provider browses the marketplace for additional hardware, financing, or services to add to the bundle and/or shopping cart. Any service provider is able to access the power model with all equipment using DesignBase Xi software to verify size and design parameters.

Figure 19:
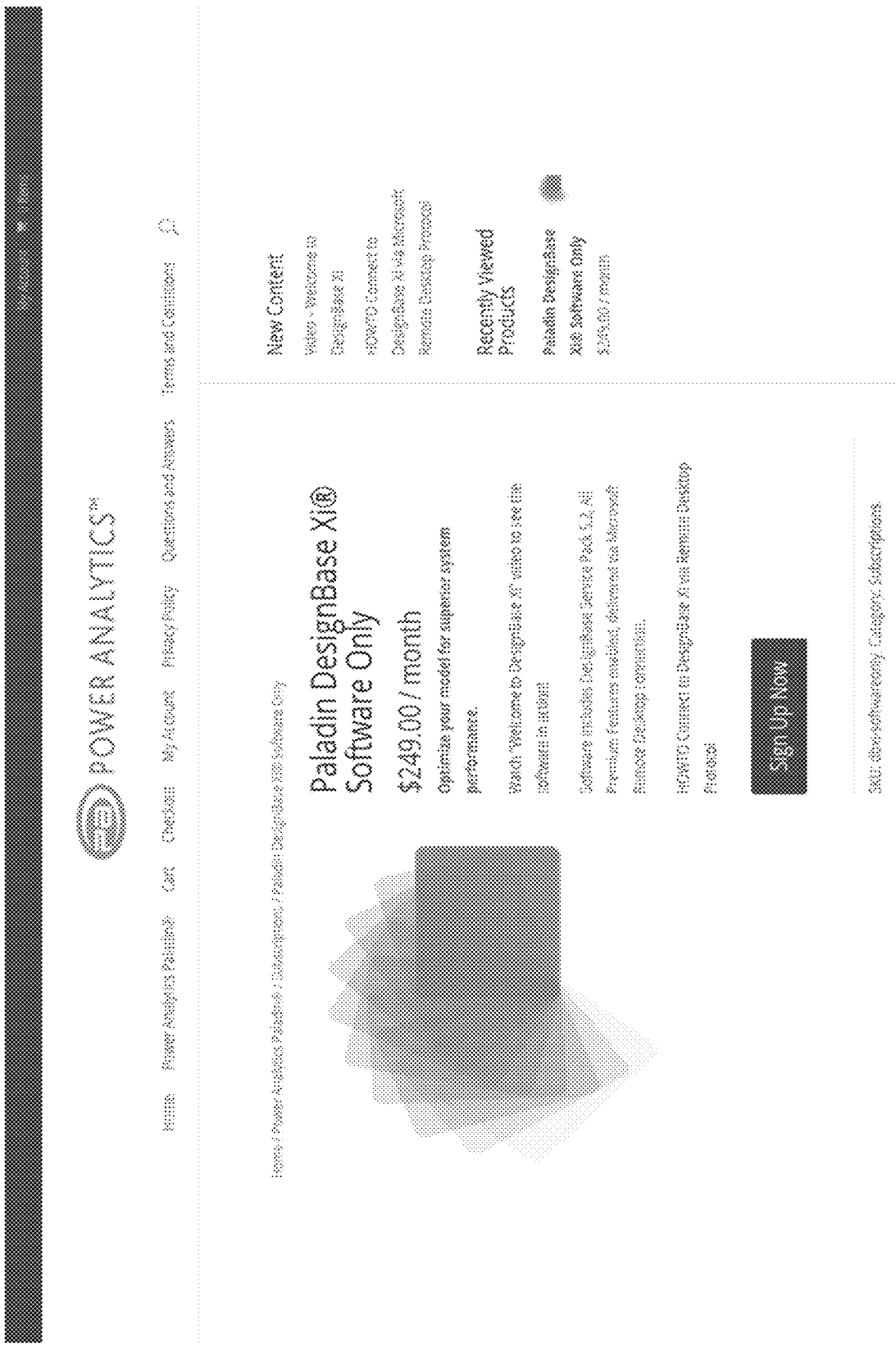
FIG. 19 illustrates an offer to purchase access to software to optimize power system model for superior system performance.

FIG. 19 illustrates an offer for software to optimize the power system model for superior system performance. A service provider instantly purchases access to DesignBase Xi via a cloud subscription to run the power model with all catalog and device information, design the interconnect, and provide power engineering approval for DER and/or microgrid installation.

Figure 20:
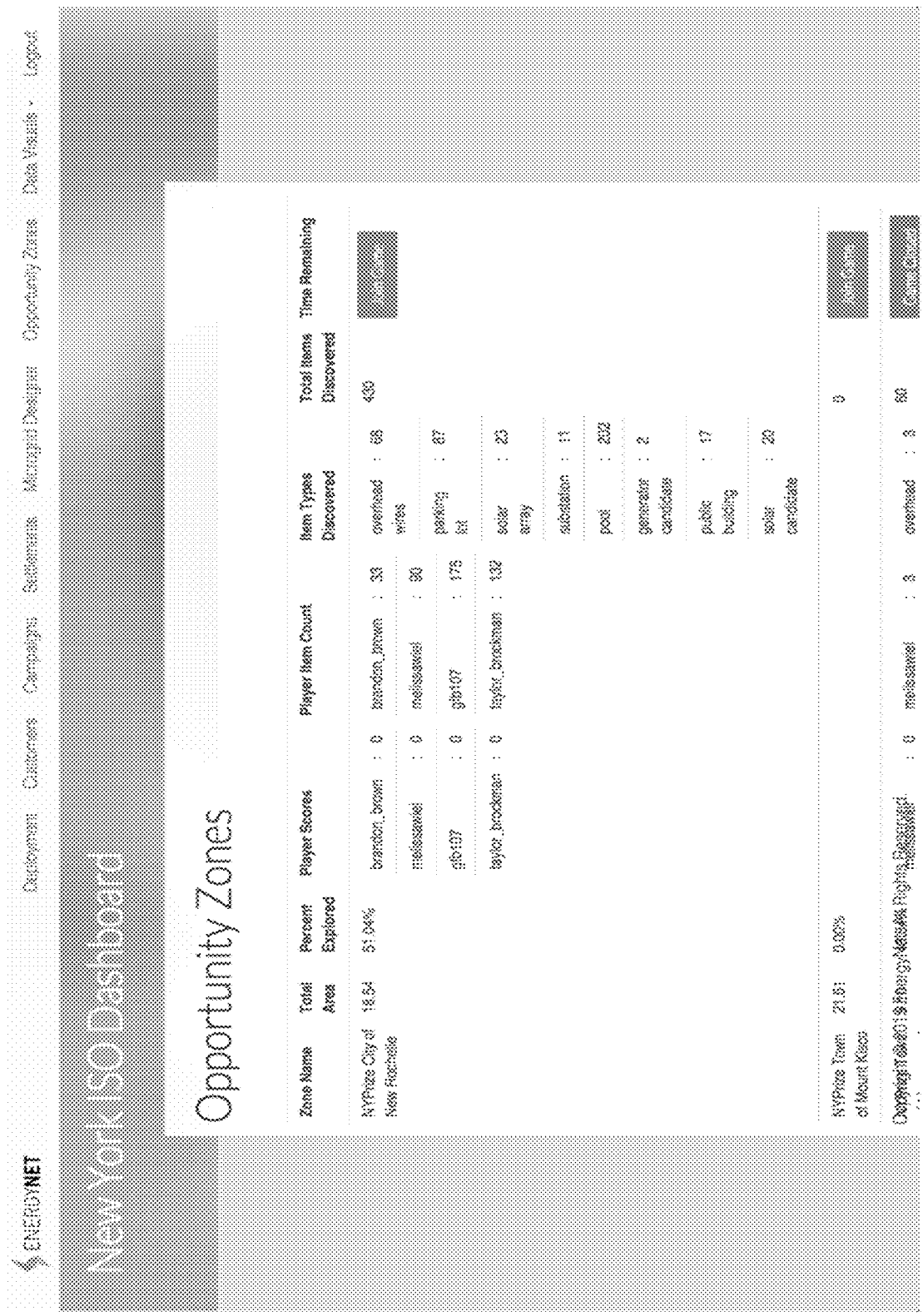
FIG. 20 illustrates identifying DER opportunity zones for cartographers.

FIG. 20 illustrates identifying DER opportunity zones for cartographers.

Cartographers include professionals who are planning and deploying large numbers of distributed energy resources and microgrids; they help discover existing unknown assets and locations (including in the gaming instance described herein) where new installation of DER asset(s) is recommended. Cartographers' searches are directed within a set of defined "opportunity zones." Cartographers collaborate as a team, usually within a specific time window, to discover existing installations plus opportunities for new installations. Prizes and incentives are awarded to players with the highest volume and accuracy within a limited game period.

Figure 21:
FIG. 21 illustrates an opportunity zone with satellite imagery.

FIG. 21 illustrates an opportunity zone with satellite imagery. Cartographers use satellite imagery of an opportunity zone to scan for elements visible from space, including solar arrays, substations, overhead wires, standby generation, power plants, and more. "MiniMaps" show the opportunity zone and explored and/or unexplored areas. Each zone has a leaderboard of progress.

Figure 22:
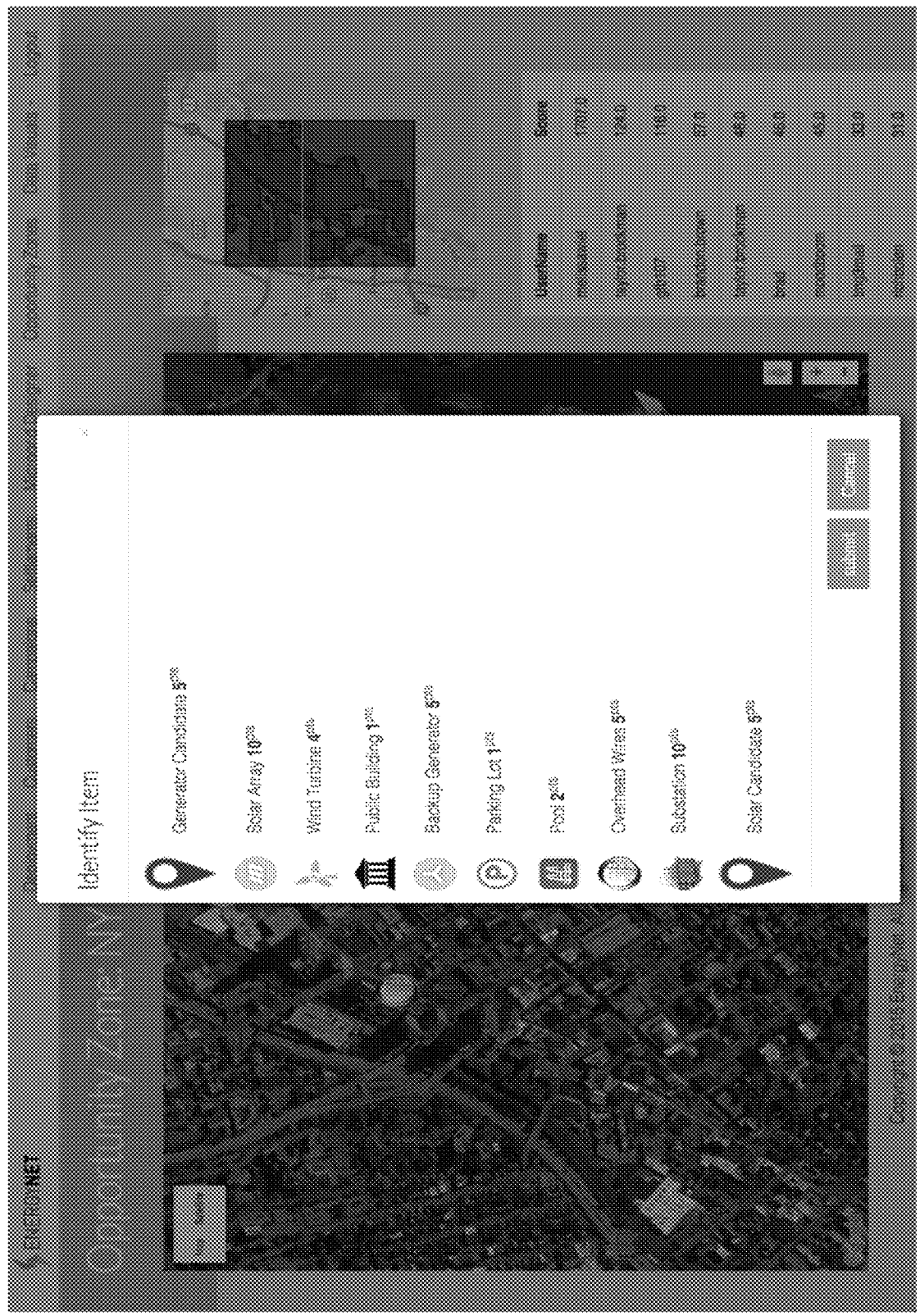
FIG. 22 illustrates a list of items to be identified in the opportunity zone in FIG. 21.

FIG. 22 illustrates a list of items to be identified in the opportunity zone in FIG. 21. Items include, but are not limited to, generator candidates, solar arrays, wind turbines, public buildings, backup generators, parking lots, pools, overhead wires, substations, and solar candidates. After visually discovering an item, a cartographer tags the asset type or opportunity type, with sizing and/or a point score to indicate value or weight. Cartographers engage in a peer review process to prevent users from adding inaccurate data to the system by giving a score and/or point penalty for mis-marked items.

Figure 23:
FIG. 23 illustrates a meter/switch integrated device and visual representation of output data from the meter functionality of the device.

FIG. 23 illustrates a meter/switch integrated device and visual representation of output data from the meter functionality of the device. EnergyNet and Microgrid Power Management System communicate with a diverse set of devices produced by OEMs that exchange information via internet protocol networks. Power Analytics creates adapters for each device type into the EnergyNet standard "Power Dictionary" to be available for upstream analysis, recommendation routines, and internal and third party software applications.

In other GUI examples in a "Network of Power" that is larger than any one company, collaboration and common data protocols are required to transact business using the systems and methods of the present invention.

Figure 24:
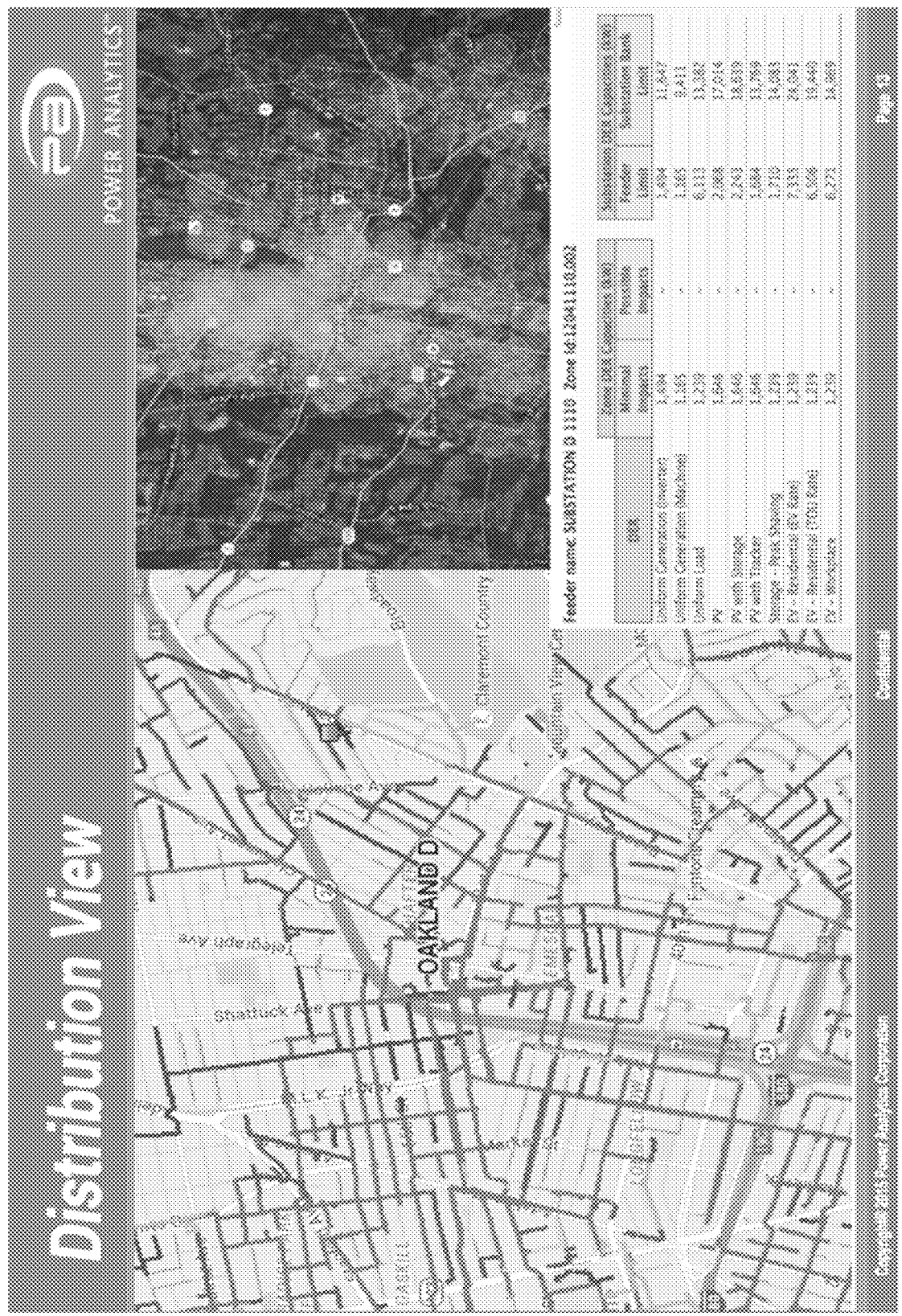
FIG. 24 illustrates a distribution view of an electric power grid over a topographic map.

FIG. 24 illustrates a distribution view of an electric power topographic map. Power Analytics or functional equivalent software and/or services provider combines publicly and privately available distribution level modeling and capacity with grid element identification to create a DER/microgrid rollout strategy and recommendation set.

Figure 25:
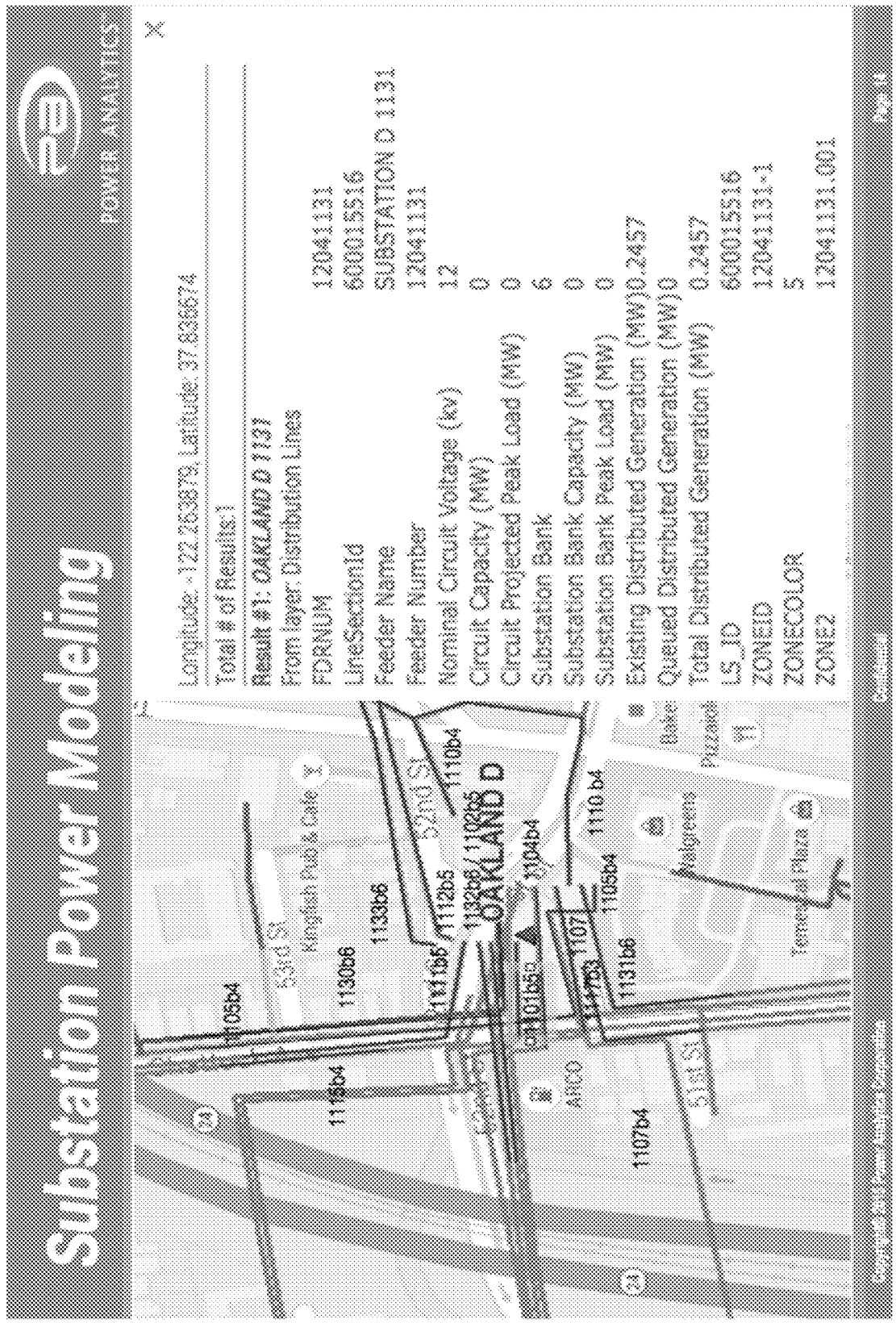
FIG. 25 illustrates a substation power modeling.

FIG. 25 illustrates a view of substation power modeling. Power Analytics or functional equivalent software and/or services provider provide individual substation, feeder, and load bank capacity sizing and DER participation plans, based on the power model.

Figure 26:
FIG. 26 illustrates DER discovery and consumer engagement through crowd-sourced gaming.

FIG. 26 illustrates DER discovery and consumer engagement through crowd-sourced gaming described for the IKEA solar example. Using satellite cartography, Power Analytics is able to locate, identify, and size a solar array nominal output within 1% accuracy.

In one embodiment, the application (e.g., smartphone app) automatically provides information via the digital contract and/or GUI associated with an app to indicate to the user (consumer) information about electric pricing plan alternatives, including but not limited to their location, the price for electric power supply on any per unit (e.g., data center, microgrid, building type (commercial or residential), facility, device, grid element, and combinations thereof) basis for a duration and/or at a predetermined time, and combinations thereof, in particular for DER assets. Also, preferably the app GUI provides additional information including marketing and advertising information about any merchants, products, and/or services associated with or related to their profile(s), power usage, activities within the system, and combinations thereof. Also preferably, the app GUI provides an interactive interface allowing inputs to be received for generating at least one account and corresponding profile, advanced energy settlements selections, etc. In one embodiment of the present invention, the received inputs are associated with a consumer or user profile that is stored on the smartphone and/or in a database associated with a server computer and/or cloud-based computing system with at least one server computer and at least one database having remote inputs and outputs via the data and communications network, preferably via secure access and/or secure messaging for authorized users associated with the at least one account.

In a virtualized or cloud-based computing system and methods of the present invention, the following components are provided as illustrated by way of example and not limitation to those described in FIG. 1. Components of a cloud-based computing system and network for distributed communication therewith by mobile communication devices include but are not limited to a server computer with a processing unit. The server is constructed, configured, and coupled to enable communication over a network. The server provides for user interconnection with the server over the network using a remote computer device or a personal computer (PC), smartphone, tablet computer, etc., positioned remotely from the server. Furthermore, the system is operable for a multiplicity of remote personal computers or terminals, for example, in a client/server architecture, as shown. Alternatively, a user interconnects through the network using a user device such as a personal digital assistant (PDA), mobile communication device, such as by way of example and not limitation, a mobile phone, cell phone, smartphone, tablet computer, laptop computer, netbook, terminal, in car computer, or any other computing device suitable for network connection. Also, alternative architectures are able to be used instead of the client/server architecture. For example, a computer communications network or other suitable architecture is able to be used. The network is the Internet, an intranet, or any other network suitable for searching, obtaining, and/or using information and/or communications. The system of the present invention further includes an operating system installed and running on the server, enabling the server to communicate through the network with the remote, distributed user devices. The operating system is any operating system known in the art that is suitable for network communication.

For example, in a microgrid management application, the EnergyNet platform is transacting between the market, utility, consumers, REPs, distribution service providers, balancing authorities, etc. The energy management system (EMS) power model includes data for frequency, voltage, VARs, state estimation, SCED, and actual or real-time information. Data associated with the microgrid is communicated over a secure IP network. The GUIs of the present invention allow for monitoring the market conditions or grid stability conditions as signalled by the distribution service providers, utilities, etc.; it also allows for monitoring of normal conditions, reserves, forecast conditions, etc. External triggers for the EMS include changes in forecast conditions, actual conditions, market conditions, market price, schedule based upon forecast price exceeding operating cost for the microgrid, etc. Software as a Service (SaaS) operable within the systems and methods of the present invention provides for dispatch of load and supply via EMS systems for distributed assets, wherein the microgrid is considered its own balancing area. So the various external triggers, including the market and/or market-based pricing, are operable as inputs to activate the isolation or connection of the microgrid according to the profile associated with the microgrid. In one embodiment, the microgrid is a secure, critical infrastructure (such as by way of example and not limitation data centers) and/or a military installation, an island (virtually or in fact an island) or facility, wherein the microgrid is locally managed in GUIs and software for grid stability and function such that the computer and software that controls the microgrid and its grid elements are located within the geographic footprint of the microgrid to enable it to function as its own balancing authority shielded from any external controls of the electrical power flows within it. A microgrid is considered any sub-grid, power generating asset, or power supplying asset that islands itself from the electric power grid and/or connect or reconnect with the main electric power grid (having external controls from the microgrid).

The EnergyNet data platform provides distinct graphical user interfaces (GUIs) for various participants of advanced energy settlements. In one embodiment, the GUIs are web-based interfaces. In another embodiment, the GUIs are interfaces of mobile application programs (Apps) for various participants.

The invention includes simulation and modeling for building demand response resources, DERs, microgrids, etc., allowing for a drag and drop that automatically triggers generation of a power model and a pro forma model having at least one generator and/or at least one load device associated with it, and an engineering interconnection based upon location, equipment, grid identifier, geodetic information, attachment point information, etc. The model considers collected data provided by the customer, historical data, and the current environment of the distribution system; it allows any operable attachment point to be an energy and market-based financial settlement point, and provides an interconnection to the attachment point. The model also indicates if devices are added, provides cost information for the devices, lists the attributes of the devices, etc., which are used as inputs to generate a cost curve that determines how much the customer will spend and funds receivable based upon participation in programs (e.g., encouraging sustainable or alternative energy).

The system includes a grid element catalog that includes attributes of the grid elements. Based upon customer inputs, the model indicates options that match or fit the customer's profile. The model also provides information about financing and energy capacity programs as provided by REP, TDSP, ISO, RTO, community, FERC, and/or the governing body of the power grid. Once the customer selects a grid element, the system provides digital contract elements and/or financing terms associated with that grid element and/or corresponding services. For example, installation, service, and maintenance contract terms for generator, solar, etc. The digital contract is a standard form document between suppliers and consumers at the wholesale or retail level. Digital contract terms are coordinated through the platform for market participants (e.g., utilities, consumers, and all parties between the utility and consumer). Digital contract terms for a grid element device are presented as part of update messaging and/or programming, through a coordinator or distributed database, or combinations thereof. Contract terms and data, including but not limited to financial settlements for grid elements and their participation on or with any electric power grid, extend through the fields of the template and function as a complex rules engine to be administered vis-à-vis the grid elements and related or corresponding services, distributed architectures, networks, etc.

The following are incorporated herein by reference in their entirety: the NYREV order, CAL ISO rules and proposed rules and subsequent order for DER marketplace, ERCOT presentation stakeholder concerns, and terms and their definitions: telemetry light, telemetry medium, PJM or other structured markets are included in this category and their rules incorporated by reference herein in their entirety, etc.

Certain modifications and improvements will occur to those skilled in the art upon a reading of the foregoing description. For example, Software as a Service (SaaS) or Platform as a Service (PaaS) is provided in embodiments of the present invention. Also, updated communications such as 5G and later alternatives are considered within the scope of the present invention. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for aggregating and integrating distributed grid element inputs, comprising: a server platform constructed and configured for network communication with a power distribution grid and at least one user device; at least one grid element operable to electrically connect to the power distribution grid and operable to participate in the power distribution grid; wherein the server platform provides a map layer and a power system model of the power distribution grid via a dynamic graphical user interface (GUI); wherein the dynamic GUI is operable to display a multiplicity of electrical components of the power distribution grid and real-time data related to the multiplicity of electrical components on the map layer of the power distribution grid based on the power system model; wherein the server platform is operable to automatically generate an updated power system model; and wherein the server platform is operable to control the participation of the at least one grid element in the power distribution grid in real-time or near real-time based on the updated power system model, wherein the controlling the participation of the at least one grid element is automated.

2. The system of claim 1, wherein the server platform is operable to provide at least one digital contract between the at least one grid element and the power distribution grid regarding a participation of the at least one grid element in the power distribution grid, wherein the participation includes supplying power to the power distribution grid, consuming power from the power distribution grid, and/or providing power curtailment to the power distribution grid.

3. The system of claim 1, wherein the map layer of the power distribution grid includes a map and/or a satellite image.

4. The system of claim 1, wherein the at least one grid element has a corresponding grid element profile, wherein the grid element profile includes automated setpoint data, a power generated value, a currently generated power value, a grid element load, a returned-to-grid value, contract, a risk metric, and a performance metric.

5. The system of claim 1, wherein the server platform is operable to provide the power system model with real-time data from the power distribution grid.

6. The system of claim 1, wherein the server platform is operable to provide an opportunity zone for identifying existing grid elements and/or opportunities for new installations over the map layer of the power distribution grid, and wherein the dynamic GUI is operable to identify the existing grid elements and/or opportunities for new installations.

7. The system of claim 1, wherein the updated power system model further integrates grid element historical data and distribution system environment data.

8. The system of claim 1, wherein the at least one grid element includes distributed energy resources, loads, standby generation, power plants, transmission lines, distribution lines, and/or substations.

9. A system for aggregating and integrating distributed grid element inputs, comprising: a server platform constructed and configured for network communication with a power distribution grid and at least one user device; at least one grid element operable to electrically connect to the power distribution grid and operable to participate in the power distribution grid; wherein the server platform provides a map layer and a power system model of the power distribution grid via a dynamic graphical user interface (GUI); wherein the power system model is operable to identify the at least one grid element and display a set of grid element attributes for the at least one grid element; wherein the server platform is operable to automatically generate an updated power system model; and wherein the server platform is operable to control the participation of the at least one grid element in the power distribution grid in real-time or near real-time based on the updated system model, wherein the controlling the participation of the at least one grid element is automated.

10. The system of claim 9, wherein the server platform is operable to generate at least one grid element cost curve, wherein the at least one grid element cost curve is based on the identifying at least one grid element and the set of grid element attributes for the at least one grid element.

11. The system of claim 9, wherein the server platform is operable to provide prizes and incentives for adding grid elements with the highest volume and accuracy within a limited time period.

12. The system of claim 9, wherein the map layer of the power distribution grid includes a map and a satellite image.

13. The system of claim 9, wherein the updated power system model further integrates a set of external triggers, wherein the set of external triggers includes a change in forecast conditions, a present forecast condition, a market condition, a market price, and/or a microgrid operating schedule.

14. The system of claim 9, wherein the server platform is operable to provide a review process to eliminate the addition of inaccurate data to the server platform via the dynamic GUI.

15. A method for aggregating and integrating distributed grid element inputs, comprising: providing a server platform constructed and configured for network communication with a power distribution grid, at least one user device, and at least one grid element; wherein the at least one grid element is operable to electrically connect to the power distribution grid and participate in the power distribution grid; wherein the server platform provides a map layer and a power system model of the power distribution grid via a dynamic graphical user interface (GUI); the dynamic GUI displaying a multiplicity of electrical components of the power distribution grid and real-time data related to the multiplicity of electrical components on the map layer of the power distribution grid based on the power system model; the server platform generating an updated power system model in real time; and the server platform controlling the participation of the at least one grid element in the power distribution grid in real-time or near real-time based on the updated power system model, wherein the controlling the participation of the at least one grid element is automated.

16. The method of claim 15, further comprising the server platform providing at least one digital contract between the at least one grid element and the power distribution grid regarding a participation of the at least one grid element in the power distribution grid, wherein the participation includes supplying power to the power distribution grid, consuming power from the power distribution grid, and/or providing power curtailment to the power distribution grid.

17. The method of claim 15, wherein the map layer of the power distribution grid includes a map and/or a satellite image.

18. The method of claim 15, wherein the at least one grid element includes distributed energy resources, loads, standby generation, power plants, transmission lines, distribution lines, and/or substations.

19. The method of claim 15, further comprising the server platform providing the power system model with real-time data from the power distribution grid.

20. The method of claim 15, further comprising the dynamic GUI discovering and tagging existing grid elements and/or opportunities for new installations.

* * * * *